(12) United States Patent
Goldberg

(10) Patent No.: US 6,526,158 B1
(45) Date of Patent: Feb. 25, 2003

(54) METHOD AND SYSTEM FOR OBTAINING PERSON-SPECIFIC IMAGES IN A PUBLIC VENUE

(76) Inventor: David A. Goldberg, 4055 Pinon Dr., Boulder, CO (US) 80303

( * ) Notice: Subject to any disclaimer, the term of this patent is extended or adjusted under 35 U.S.C. 154(b) by 0 days.

(21) Appl. No.: 09/242,987
(22) PCT Filed: Sep. 3, 1997
(86) PCT No.: PCT/US97/15829
§ 371 (c)(1), (2), (4) Date: Feb. 26, 1999
(87) PCT Pub. No.: WO98/10358
PCT Pub. Date: Mar. 12, 1998

Related U.S. Application Data

(60) Provisional application No. 60/029,431, filed on Nov. 12, 1996, provisional application No. 60/028,873, filed on Oct. 16, 1996, and provisional application No. 60/025,442, filed on Sep. 4, 1996.

(51) Int. Cl.[7] ............................................. G06K 9/00
(52) U.S. Cl. ...................................... 382/115; 382/103
(58) Field of Search ................................ 382/115, 116, 382/117, 118, 119, 103; 340/5.1, 5.2, 5.32, 5.7; 233/382; 235/380, 382, 382.5; 386/117; 713/168

(56) References Cited

U.S. PATENT DOCUMENTS

| | | |
|---|---|---|
| 4,991,205 A | 2/1991 | Lemelson |
| 5,164,992 A | 11/1992 | Turk et al. |
| 5,321,396 A | 6/1994 | Lemming et al. |
| 5,363,504 A | 11/1994 | Hasuo |
| 5,381,155 A | 1/1995 | Gerber |
| 5,432,864 A | 7/1995 | Lu et al. |
| 5,493,677 A | 2/1996 | Balogh et al. |
| 5,554,984 A | 9/1996 | Shigenaga et al. |
| 5,566,327 A | 10/1996 | Sehr |
| 5,576,838 A | 11/1996 | Renie |
| 5,598,208 A | 1/1997 | McClintock |
| 5,602,375 A | 2/1997 | Sunahara et al. |
| 5,629,981 A | 5/1997 | Nerlikar |
| 5,655,053 A | 8/1997 | Renie |
| 5,666,215 A | 9/1997 | Fredlund et al. |
| 5,947,369 A * | 9/1999 | Frommer et al. ........... 235/380 |

FOREIGN PATENT DOCUMENTS

WO   WO 95/24795   9/1995

* cited by examiner

Primary Examiner—Joseph Mancuso
Assistant Examiner—Vikkram Bali
(74) Attorney, Agent, or Firm—Sheridan Ross P.C.

(57) ABSTRACT

A method whereby personalized photographic images are obtained of patrons in an entertainment venue, such as a theme park. The system employs a unique machine-readable identification tap (49) located in a device such as a card, pin, or bracelet, which is attached to the patron (43). The identification tag is decoded by readers (52) positioned at various locations within the entertainment venue. This identification information is matched with electronic images of the patron carrying the identification tag that are captured by digital cameras (63). The electronic images along with the matched patron identities are collected at a storage device (71). At a distribution station (77), the patron can view images (85) corresponding to his tap identification, and the images may be printed (87) or may be delivered in electronic form on a videotape, CD, or e-mail. The images distributed to patrons may be single-frame images or video recorded images with audio. The images may be modified for entertainment effect prior to distribution.

68 Claims, 13 Drawing Sheets

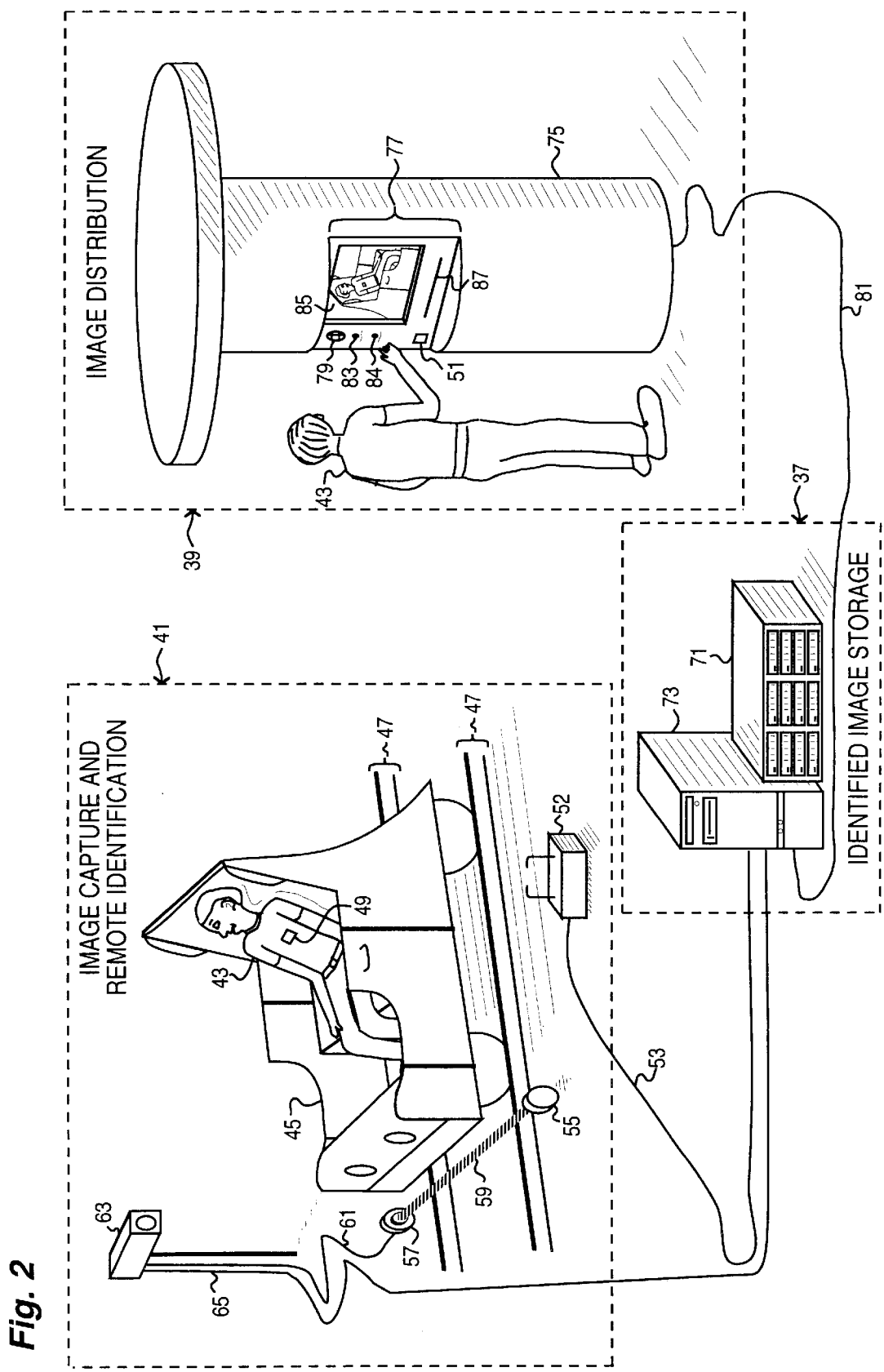

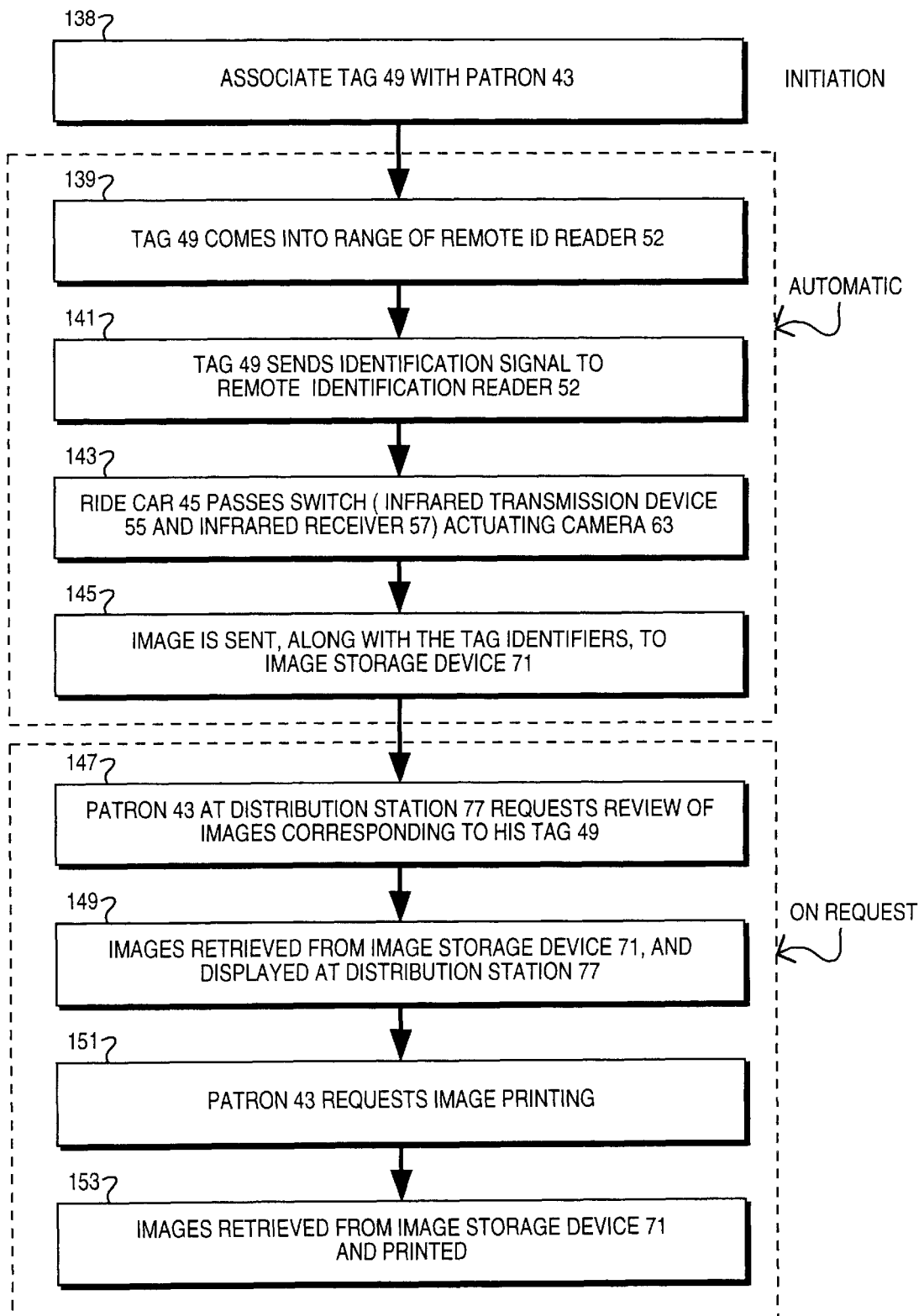

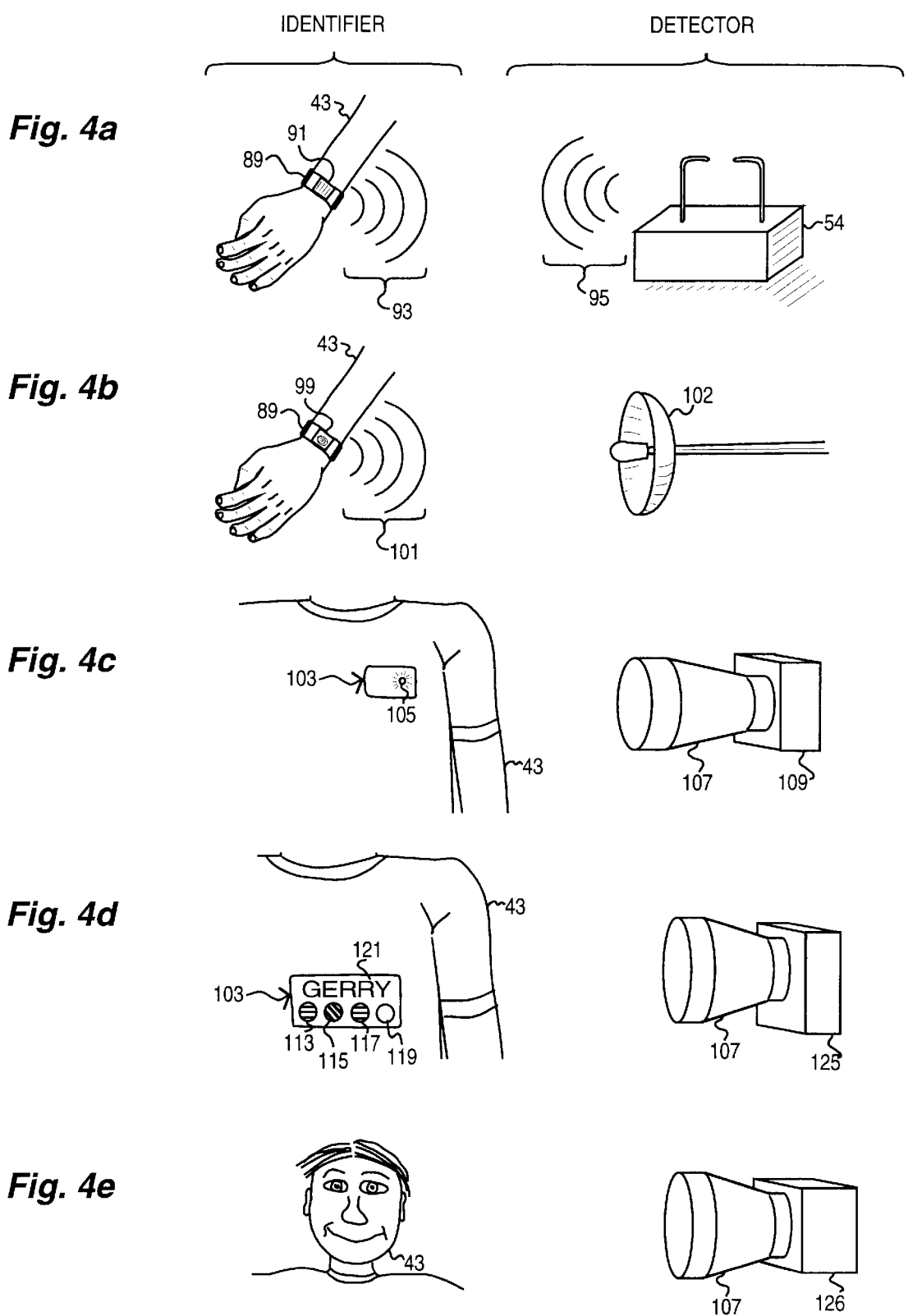

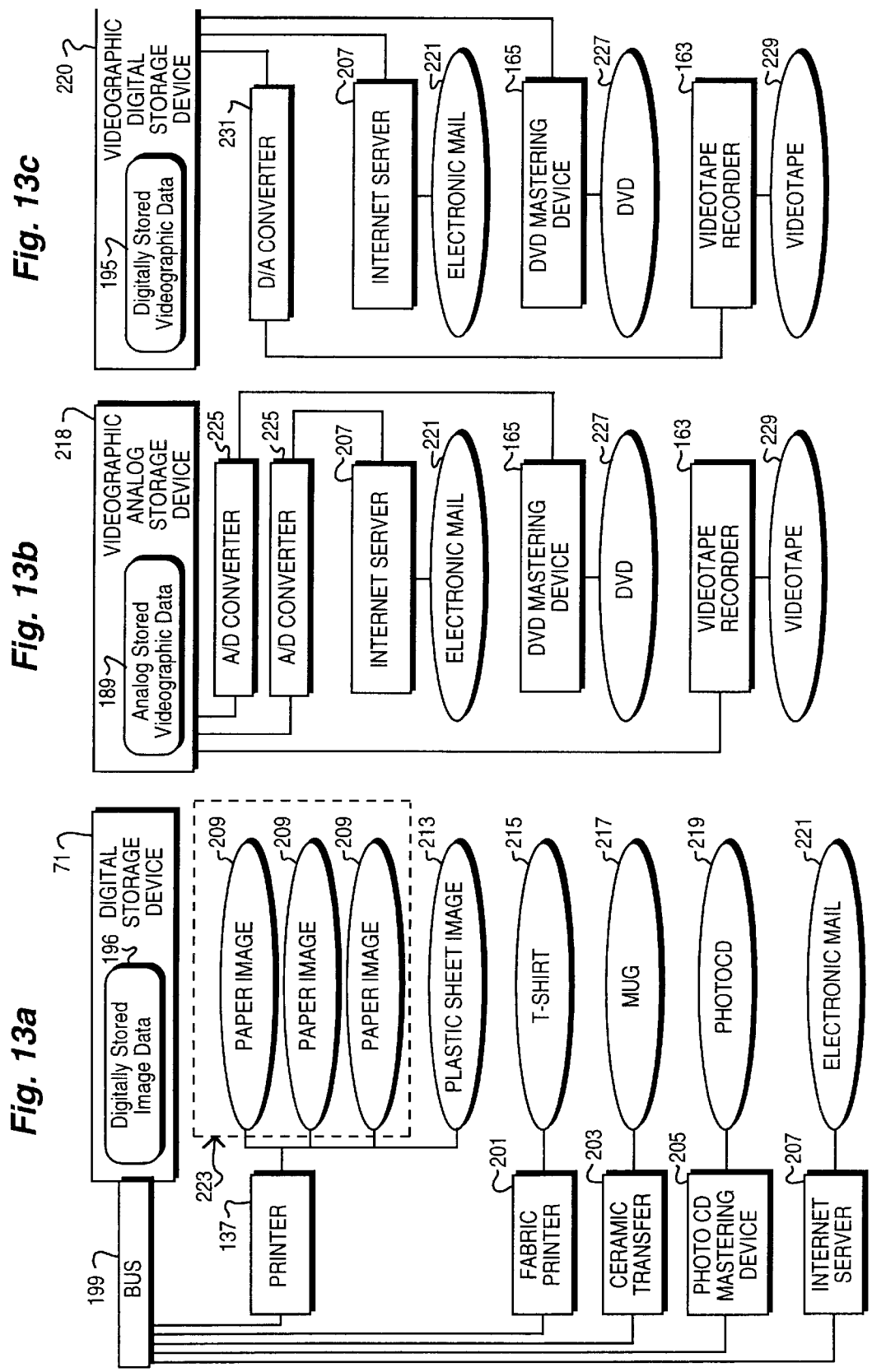

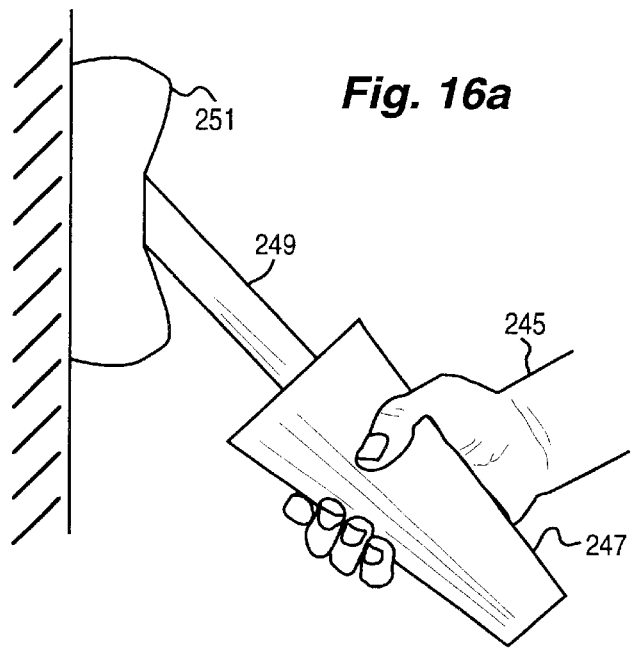
Fig. 16a
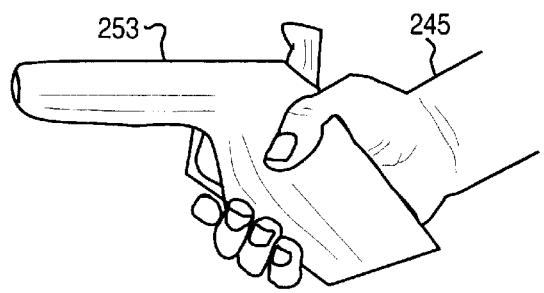
Fig. 16b
Fig. 16c
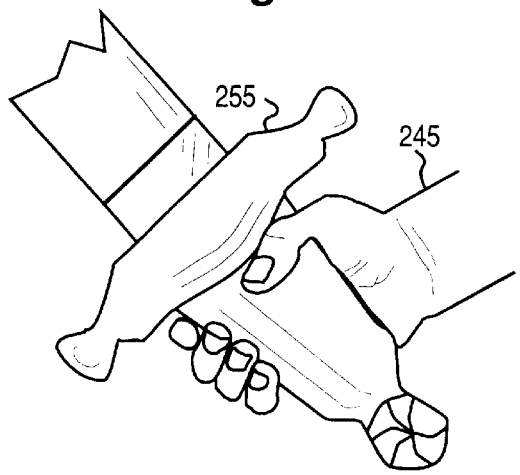
Fig. 16d
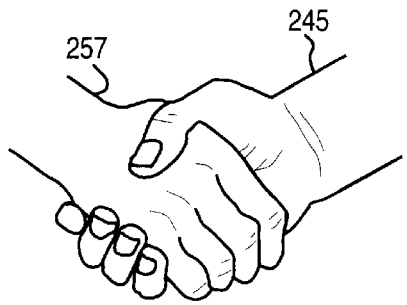

METHOD AND SYSTEM FOR OBTAINING PERSON-SPECIFIC IMAGES IN A PUBLIC VENUE

CROSS-REFERENCE TO RELATED PATENT APPLICATIONS

This application is related to and claims priority from Provisional Patent Application No. 60/025,442, filed Sep. 4, 1996, titled "System for Obtaining Personalized Photographic Images in a Large Entertainment Venue," and from Provisional Patent Application No. 60/028,873, filed Oct. 16, 1996, titled "System for Obtaining Personalized Photographic Images in a Large Entertainment Venue," and from Provisional Patent Application No. 60/029,431, filed Nov. 12, 1996, titled "System for Obtaining Personalized Photographic Images in a Large Entertainment Venue, " the contents of each of which are incorporated herein by reference.

TECHNICAL FIELD

The present invention relates to a method for taking digital images of people in a public venue so that the images corresponding to a given person can be retrieved.

BACKGROUND

When patrons visit a large and varied entertainment setting, such as the theme parks Disney World or Six Flags Over Texas, they often wish to collect a permanent memento of their attendance. Often, this memento comprises photographs taken by the patron or those traveling with the patron.

One difficulty with obtaining this type of photographic image is that suitable camera angles may be difficult or impossible for the patron to achieve. For instance, while on a roller coaster ride, picture taking is generally disallowed, requiring pictures to be taken from a distance. In addition, the patron may have difficulties obtaining pictures of himself, or the patron may not either have or remember or have the opportunity to use his picture taking equipment.

In order to compensate for these difficulties, provide patrons with suitable mementos, and to obtain additional sources of revenue, entertainment venues may take photographs for sale to the patron. These pictures may be staged pictures, as in "Old Time" photographs where the patron dresses in costume or places their head in a board cutout such that the patrons head is located just above the image of the body of a person in another context. Alternatively, a professional photographer may take a picture of the patron positioned next to an actor clothed in a costume of a well-known cartoon character. These staged pictures, however, present only a limited number of opportunities in which to obtain images of patrons, and furthermore these methods are generally unsuitable for the tens or hundreds of thousands of patrons who might visit a theme park in a single day.

In order to compensate for some of these difficulties, at some theme parks cameras are placed strategically within rides so as to capture each patron at a particular moment in the ride's course.

For example, at Disneyland in California, a camera is located so as to photograph each load of riders on a water ride at the moment of maximum excitement. The photographs are arranged to be displayed to each participant as they exit the ride, in order to entice them to purchase the photographs as a keepsakes.

This method of taking pictures of patrons on rides has proven popular with patrons, but has a number of practical limitations that limit its usefulness and applicability. For example, after standing in line to participate in the ride, the patron must stand in another line to obtain their picture. Only one or a small number of images may be purchased by the patron at each ride. Importantly, the patron must remember a number corresponding to their picture in order to obtain their picture from among the multitude taken at the theme park each day. Thus, patrons must generally purchase their picture directly after their ride in order to be able to remember their number. This cumbersome and time-consuming process limits the number of images that each customer might obtain during the day. These limitations affect both the satisfaction of the patron and the revenues for the theme park.

SUMMARY OF THE INVENTION

In light of the deficiencies of existing picture taking systems, it is an objective to allow people to obtain many pictures of themselves at a number of different activities within a public venue.

It is additionally an object of this invention to provide inexpensive pictures to people.

It is another object of this invention for people to obtain images from vantages that they themselves cannot easily reach.

It is a further object of this invention to allow people to obtain images which have been altered to enhance their entertainment effect and appeal to the widest range and number of people.

It is also an object of the invention to provide additional revenue sources for entertainment venue operators.

It is an additional object of this invention to provide imaging means which are relatively inexpensive to install.

It is still another object of this invention to provide imaging means with relatively low operating costs.

It is yet an additional object of this invention to provide an imaging means that may be employed at a number of different venues, including theme and amusement parks, ski slopes, beaches, cruise ships, casinos, and event centers.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a method for obtaining images of a person in a venue. The method includes the steps of capturing at least one electronic visual representation of the person, remotely identifying the person with a corresponding predetermined digital identifier, transferring the electronic visual representations and the digital identifier to a common electronic storage means, storing the electronic visual representations in the storage means so that the digital identifier of the person whose representation is stored can be established, and distributing to the person the electronic visual representations corresponding to the digital identifier of the person.

The step of remotely identifying may utilize a tag conveyed by the person. The tag may comprise a radio frequency transmitter, which may additionally comprise a means for detecting an external radio frequency signal. Alternatively, the tag may comprise a sonic transmitter or a pulsed light output means, which may be a light emitting diode. The tag may also comprise a visual identifier, which may include a bar code or printed text. These tags may be secured circumferentially about the wrist of the person.

The step of remotely identifying may incorporate a step of machine-executed facial recognition of the captured electronic visual representation.

The step of remotely identifying may have a maximal operational distance greater than 6 inches.

The step of capturing may be performed with a charge-coupled device or a complimentary metal oxide semiconductor device.

The step of capturing may comprise videographic recording.

The steps of capturing, transferring, storing and distributing may additionally include the capturing, transferring, storing, and distributing an electronic audio representation of the person in conjunction with the electronic visual representation of the person.

The method may additionally include the step of modifying the electronic visual representation. This modification may comprise the extraction of image elements corresponding the person from the surrounding background, and the placement of the image elements corresponding to the person onto an unrelated background. The modification may also comprise replacing pixels from the area of the digital image corresponding to the person's face with unrelated pixels. The modification may in addition comprise interspersing pre-recorded videographic recordings not containing the person with videographic recordings of the person.

The step of storing may comprise placing the electronic visual representation of the person in digital or analog format on a magnetic tape, or in digital form on a computer disk.

The step of distribution may include printing the visual representation of the person on a paper substrate. Also, a multiplicity of different visual representations of the person printed on a multiplicity of paper substrates may be bound together. The visual representation of the person may also be printed on a plastic, ceramic or fabric substrate.

The step of distribution may comprise placing the electronic visual representation in digital format on a thin-film magnetic substrate, which may be a computer disk or a magnetic tape. Distribution may comprise placing the electronic visual representation in analog format on a thin-film magnetic substrate, which may be a magnetic tape.

The step of distribution may include placing the electronic visual representation in digital format on an optically-addressed substrate, which may be a compact disk, or a digital versatile disk.

The step of distribution may include the step of transmitting the electronic visual representation in digital format over a wide-area digital communications network, which may be the Internet.

The representation and the identifier are transferred in separate communication channels, or they may be transferred in a common communication channel in an interleaved manner.

The representation may be transferred through a distance by a radio frequency transmission.

Distribution may involve the use of a monitor on which visual representations corresponding to the person requesting visual representations for distribution can be viewed by the person. The monitor may include a human input means by which the person may select between alternative visual representations for distribution, or between different substrates on which the visual representation is placed for distribution.

The means of capturing may be located in a fixed, predetermined location, or may move in a predetermined path, which may be substantially the same path as that taken by the person whose picture is being captured. The means of capturing may be physically attached to a means of conveying the person.

The step of remotely identifying may utilize a tag reader which is physically attached to a means of conveying the person.

The venue may be an amusement park.

The method of the present invention may include the additional step of presenting the person with a task directing the person to perform an observable action, where this task may require the person to touch an object, and this object may be substantially in the shape of an article represented in the unrelated image.

The present invention may also be instantiated in an apparatus for selectively displaying electronic images to a person in which visual representations of the person are present within the image. This apparatus comprises a video output terminal for displaying electronic images, remote identification means for determining the identity of the person when the person is within a predetermined distance of the video output terminal, remote image storage means from which images containing a visual representation of a given person may be retrieved and bi-directional communication means for sending requests for images to the remote image storage from the video output terminal and for sending images from the remote image storage to the video output terminal. In operation, the detection of the person by the remote identification means causes the display of images containing visual representations of the person on the video output terminal. This apparatus may include a human input means that is accessible to the person when the person is within the predetermined distance of the video output terminal, whereby the person may choose images for purchase.

BRIEF DESCRIPTION OF THE DRAWINGS

FIG. 2 is a perspective and schematic view of a person-specific imaging system in which images of theme park patrons on a ride are captured, classified and distributed to the patrons, utilizing the method shown in FIG. 1.

FIG. 3 is a block schematic presenting a typical event flow for the person-specific imaging system depicted in FIG. 2.

FIGS. 4a through 4e are perspective views of identifiers and detectors for different remote identification systems that may be employed in the present invention.

FIG. 13a is a block schematic of a distribution system for single images that is part of a person-specific imaging system incorporating different output devices.

FIG. 13b is a block schematic of a distribution system for videographic images stored as analog data that is part of a person-specific imaging system incorporating different output devices.

FIG. 13c is a block schematic of a distribution system for videographic images stored as digital data that is part of a person-specific imaging system incorporating the same output devices as shown in FIG. 13b.

FIG. 16a is a side-view image of the patron's hand as seen by the camera while the patron is engaging in task response as shown in FIG. 15.

FIGS. 16b through 16d are views of digital modifications of the image shown in FIG. 16a.

BEST MODES FOR CARRYING OUT THE INVENTION

Overview of the Steps

Figure 1:
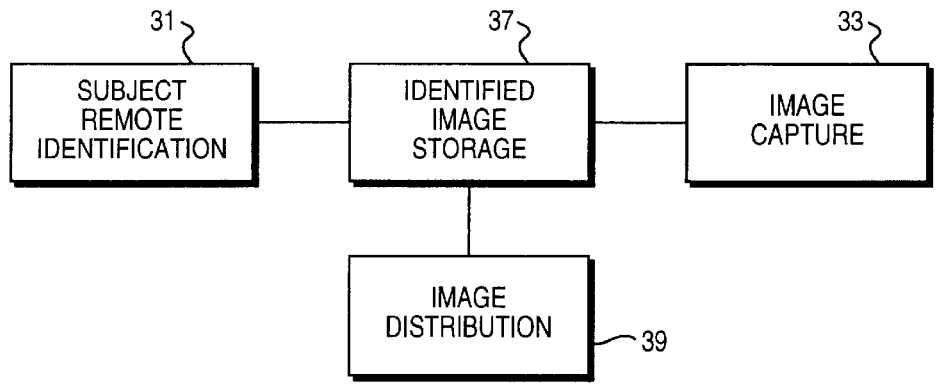
FIG. 1 is a functional block diagram of the method of the present invention.

An overview of the steps of the present invention is shown schematically in FIG. 1, a block diagram. A step of subject remote identification 31 comprises identifying the subject whose image is to be captured. A separate step of image capture 33 involves the electronic capture of an image, either digitally or in analog form. The subject identification and captured image are combined and placed in storage, either temporary or permanent, in an identified image storage step 37. Finally, the image is distributed, usually to the subject identified in the subject remote identification step 31, in an image distribution step 39.

As shown in FIG. 1, the steps of subject remote identification 31 and image capture 33 may be distinct from one another, and the outputs of these steps may feed separately into the step of identified image storage 37. The order and timing of the remote identification 31 and the image capture 33 may vary. Thus, the remote identification 31 may either precede, be coincident with, or follow the image capture 33.

The combination of the steps of subject remote identification 31 and the step of image capture 33 is of paramount importance in the present invention. By automatically establishing the identity of the subjects within a captured image with remote identification 31, images can be stored and then retrieved by individual theme park patrons without the need for human intervention or conscious interaction (such as remembering a number) to aid image distribution 39 to the proper patron. This removes a practical bottleneck in the distribution of images in a large public venue.

An Embodiment of the Present Invention

FIG. 2 is a perspective view, in which images of theme park patrons on a ride are captured, classified and distributed to the patrons. The steps of subject remote identification 31 and image capture 33 are combined into a combination image capture and remote identification step 41. A patron 43 rides in a theme park amusement car 45, which rides on a pair of rails 47. The patron is wearing a remote identification tag 49 affixed to his shirt. In response to a signal originating from a remote identification (ID) reader 52, the tag 49 transmits a signal that can be received and identified by remote ID reader 52 as the car 45 with patron 43 passes the remote ID reader 52. The identity of the patron 43; is transmitted through an identification transfer wire 53 to a storage controller 73, which stores to, and retrieves identified images from, an image storage device 71. The functioning of the remote ID tag 49 and the remote ID reader 52 may take many forms and will be described in more detail below.

An infrared light beam 59 is generated at an infrared transmission device 55, and is received by an infrared receiver 57. When the car 45 passes through the path of the infrared light beam 59, reception of the light beam 59 energy at receiver 57 is interrupted, and a signal is passed to a digital camera 63, causing the camera 63 to capture an image of the car 45 and its passenger patron 43. The digital image so captured by camera 63 is then transmitted to the storage controller 73 through an image transfer wire 65, from which it is then stored in image storage device 71.

The step of image distribution 39 is carried out at a kiosk 75 which incorporates a distribution station 77. The distribution station 77 incorporates a monitor 85 on which captured images are displayed for the patron 43 to review. An integral remote ID reader 51 is included to identify the patron 43, so as to determine which images are to be retrieved from the image storage device 71 through distribution cable 81. Interaction means are provided to the patron 43 to select and choose images by presentation of the images on a viewing screen 85. Chosen images may be printed in the workstation 77 and distributed to the patron through image distribution slot 87.

The interaction means may include a plurality of buttons 83 and 84 supplemented by a speaker 79 for communicating audible commands and assistance to the patron 43. In this case, the button 83 is labeled "YES" and the button 84 is labeled "NO". Depending on the nature of the queries presented on the screen, these buttons 83 and 84 can be used to either select images for purchase, or to select the format on which the images should be delivered. For example, the screen could present the query, "Would you like the pictures to be printed on paper?" and by pressing the button 83 or the button 84, the patron 43 would determine whether the images were printed on paper.

Many other possible user interfaces might be used, including ones with a larger number of buttons. Also, the buttons 83 and 84 might have labels programmably configurable, changing according to the question asked of the patron 43, so that instead of the query presented above, the query could be alternatively phrased, "On which surface would you like your pictures printed, paper or plastic?" and the user could respond by pressing the button 83 transiently labeled "PAPER" or by pressing the button 84 transiently labeled "PLASTIC." Requests for images to be retrieved are sent back to the image storage device 71 and its controller 73 through distribution cable 81.

FIG. 3 is a block schematic presenting a summary typical event flow for the first embodiment, and may be read with reference to FIG. 2. In an initiation step 138, performed once, the tag 49 is given to the patron 43, establishing the association of the tag 49 with the patron 43. It may be that all subsequent steps of image capture and distribution will be linked solely with the physical association of the tag 49, so that the patron 43 can retrieve images as long as the patron 43 still has physical possession of the tag 49. However, in order to compensate for the possibility that the patron 43 will lose the tag 49, or that the images may be able to be retrieved at a time after the patron 43 no longer has possession of the tag 49, a record of the association of the tag 49 with the patron 43 will generally be made, and stored in a digital database. Then, images associated with the tag 49 can be automatically be associated with the corresponding patron 43.

In step 139, the remote ID identification tag 49 comes into range of the remote ID reader 52. In step 141, the tag 49 sending its identifying signal to the remote ID reader 52. The system now has information about the identity of the patron 43, as well as the patron's approximate location in the ride, due to the generally short transmission distance of the tag 49. Because the system also has knowledge about the locations of each car 45 in a ride, the system can now identify the patrons 43 to a particular car 45 in specific captured images.

In step 143, the car 45 carrying the patron 43 passes a switch (comprised in this case of the infrared transmission device 55, its infrared light beam 59, and the infrared receiver 57) and which actuates the camera 63. Because the switch indicates the instantaneous position of individual cars 45, and the location of patrons 43 in different cars 45 is known, then the identity of a particular patron 43 within the photographic image can be inferred.

In step 145, the image and patron identities, as well as potentially other relevant information, are sent over a communications network (in this case, comprising identification transfer wire 53 and image transfer wire 65) to the image storage device 71 (in this case, through storage controller 73), which stores the information on an easily retrievable medium, such as an array of hard drives. A patron 43 at a distribution station 77 who wishes to review the images taken of him interacts with the station 77 in step 147, initiating a command to the storage controller 73 to retrieve the images corresponding to one or more patrons from storage device 71. In step 149, those images are retrieved from the image storage device 71, and sent to the distribution station 77. The patron, in step 151, after reviewing the images, then processes requests for images to be printed. In step 153, the images are printed on paper or as a memento, and are delivered to the patron 43.

Steps 139, 141, 143, and 145 will be performed frequently for each patron 43, once for each image recorded, as they move through the entertainment venue and participate in various rides and activities. These steps will occur largely unknown to the client since they occur through automatic means. Steps 147, 149, 151 and 153, on the other hand, will be performed only on the one or more occasions that the patron 43 wishes to review the images or order prints.

The following sections describe the preceding steps in more detail, including a number of modifications of this preferred embodiment that are within the scope of the present invention.

The Step of Subject Remote Identification 31

Remote identification 31 requires identification at a distance, as opposed, for example, to a physical transfer of an identification card on which information on a magnetic stripe is read by a reader. Such physical transfer schemes require conscious action on the part of the patron, causing interruption in the entertainment experience and possible interference with crowd dynamics (e.g. slowing the speed of patrons moving through an entrance line). Remote identification, on the other hand, is automatic and can occur without the patron being aware of the process.

Examples of remote identification include radio frequency identification (RFID), LED transmission with photodetector detection, sonic transmitters and microphones, and visual identification means such as bar coding, facial recognition, iris scanning, and visual symbology coding. In these techniques, there is no physical contact between the object being identified and the mechanism which performs the identification. While some of these methods work at distances of a mile or more, most of these operate best in the ranges of inches to tens of feet, which is the proper distance for the present invention. It should be understood that remote identification as applied to this invention may involve relatively small distances on the order of less than a foot.

Remote identification methods generally involve at least two distinct elements, an identifier and a detector. The identifier is the characteristic by which the object to be identified is distinguished from other like objects. The identifier may be a characteristic intrinsic to the object to be identified, such as the physical size and placement of features on a face, where the identifier can be detected from a distance by an electronic or mechanical device. Alternatively, the identifier may be an extrinsic tag by which the object can be identified, such as a radio transmitter which transmits a unique code. The detector is the device that detects the identifier from a distance and interprets the identity of the object. The detector is matched in function to the form of the identifier. Thus, an identifier that incorporates a sonic signal transmission will be matched with a detector such as a microphone, and a visible identifier such as a bar code will be matched with either a digital camera, which detects reflected illumination, or a laser scanner, which both generates an illumination signal as well as detects the reflected light energy.

These extrinsic tags may take on a number of different physical forms, including wrist bracelets, necklaces and pendants, cards with pinning attachments to be worn on shirts, hats, or other garments, or with loops to be hung on belts. The manner in which the tags are pinned, carried or worn is, in general, not specific to a particular form of identifier, and many identifier types can be used with different physical forms.

It should be noted that at a particular time, each identifier is associated with a unique code. The identifiers will generally, though not necessarily, be reused by different patrons 43 over the useful lifetime of the identifier. Thus, either a method of writing a new code to a identifier must be available, or a database must be maintained which indicates which patron 43 is identified with which identifier on a specific date or at a specific time.

A number of different identifiers and their corresponding detectors, along with the techniques that govern their use, will be considered in the following sections, and are depicted in perspective views FIG. 4a through FIG. 4e.

Radio Frequency Identification (RFID)

Radio frequency identification (RFID), in overview, involves a mobile radio transmitter which is prompted to transmit a short digital identification signal (often between 32 to 128 bits) in response to an interrogation radio frequency signal. The mobile radio frequency transmitter generally signals either in the 30–500 kHz or 0.9–3 GHz ranges. The RFID transmitter comes in two general forms passive or active. In active RFID, a miniature battery or other source of power is packaged locally to the mobile transmitter. Generally, active RFID devices transmit over distances of feet to tens of feet, but these distances may sometimes range to thousands of feet.

Passive RFID, on the other hand, does not carry a local source of power, and thus its transmission range is limited by the amount of power from the interrogation device that can be reflected or accumulated by a receiver coil and associated circuitry located within in the transmitter. Passive RFID devices are often limited in transmission range from a couple of feet to 10 or more feet.

One embodiment of an RFID remote identification device is shown in FIG. 4a, a perspective diagram. In this case, the identifier involves a bracelet 89 that is worn by the person to be detected. The bracelet 89 incorporates an RFID tag 91, which both detects an interrogation signal 95 from an RFID reader 54, as well as transmits a digital identification radio signal 93 that is detected by the RFID reader 54. The RFID reader 54 comprises electronics which perform both the transmission of the interrogation signal 95 and the reception of the digital identification radio signal 93. The bracelet 89 could be alternatively chosen from a number of worn or carried accessories, including a necklace, a pin, a badge, a card, or a small figurine, with the limitation that it would need sufficient free volume and cross-sectional area to incorporate the RFID tag 91 components, including a radio receiver, transmitter, and possibly a battery (in the case of an active RFID transmitter)

The RFID tag 91 could be either a passive or an active RFID transmitter. If the tag 91 is an active RFID tag, it would also incorporate a source of power such as a battery.

The use of an interrogation means in the tag 91 is not required. For instance, the radio signal 93 could be continuously transmitted or transmitted in discrete and frequent bursts, rather than only in response to the interrogation signal 95. This mode of operation, however, would require an active RFID design and a more substantial power supply local to the RFID tag 91 to power this frequent transmission.

RFID is well-suited for this remote identification application because the tag 91 can be detected from all directions, and the signals are not limited by line of sight, but can be detected through a wide range of non-conducting materials.

There are a number of RFID transmitters and readers available on the market, including the $i^2$ system from SCS Corp. (San Diego, Calif.) and the SAMsys system from SAMSys Technologies (Toronto, Ontario, Canada).

Sonic Transmitter FIG. 4b is a perspective diagram of a sonic transmission remote identification system. This embodiment involves a worn or carried device as an identifier, in this case the bracelet 89, into which a sonic transmitter 99 is incorporated. The sonic transmitter 99 in this case includes a battery supply, and emits a digital sonic identification signal 101 at regular intervals. This signal 101 is detected and interpreted by a directional microphone 102.

It should be noted that the directional microphone 102 could be replaced by a microphone without directional preference. This scheme would depend solely on the proximity of the sonic transmitter 99 to the non-directional microphone, rather than being in the proper orientation. Furthermore, there are a number of different means of obtaining microphone directionality, including the use of parabolic dish collectors and noise-canceling microphones. The parabolic dish collector has the advantage of having a large collecting surface, increasing microphone sensitivity at a distance.

As with RFID, the sonic transmission system depicted in FIG. 4b could also include a sonic or radio frequency interrogation signal (similar to interrogation signal 95) sent from the directional microphone 102 to the sonic transmitter 99 to trigger the sonic transmitter 99, in which case the sonic transmitter 99 would need to incorporate a receiver for the interrogator signal.

Light Transmitter

FIG. 4c is a perspective diagram of a light transmission-based remote identification system. This embodiment involves as identifier a badge 103 which is worn on the outside clothing of the patron 43. Located on the badge 103 is a flashing light source 105, where the flashes are timed so as to incorporate a digital identification signal.

Detection is performed using a lens system 107 with an infrared (IR) detector 109. This IR detector may be either an array detector, such as a CCD (charge-coupled device) or CMOS (complimentary metal oxide semiconductor) camera, or may alternatively be a monolithic detector, such as an electronic device incorporating a photodiode or photoresistor. The lens system 107 confers directionality to the IR detector 109, and by capturing more light onto the detector 109, increases its sensitivity.

The light source 105 could incorporate an infrared or visible light emitting diode (LED). Because LEDs exhibit a strong directional preference in light emission, a light diffuser might be incorporated into the light source 105 so as to allow identification from a range of different orientations relative to the badge 103.

Optical Symbology

FIG. 4d is a perspective diagram of an optical symbology remote identification system. This embodiment uses as identifier a badge 103 on which a visible symbology is printed. In this case, the symbology comprises a set of 4 colored circles 113, 115, 117, and 119 in conjunction with a printed text string 121 ("GERRY"). As shown, circles 113 and 117 are the same color, circle 115 is a second color, and circle 119 is yet a third color.

The detector comprises the lens system 107 with a digital CCD camera 125. The arrangement of colored circles is imaged by the lens system 107 on the light capture array within the digital camera 125, and the sequence of colors assigned to the circles 113, 115, 117, and 119 would comprise a symbology providing identification. For example, each distinct color could indicate a distinct number, and the position of the circle would indicate the place in a composite, multi-digit number. For example, if each circle takes on one of eight colors, each circle could then represent an octal number (that is, a digit in a base eight numerical system). The four circles could then represent a four-digit octal number, representing 4096 possible identifiers, with each circle representing a different digit within the number. Note that this scheme, using colored symbologies, would require that the CCD camera 125 be a color discriminating camera.

Using a larger number of circles taking on one of two possible states (e.g. black and white), a binary numerical system could be used with a black and white CCD camera 125 instead. Alternatively, black and white patterns (e.g. clear versus horizontally striped versus vertically striped versus solid black) could be employed.

The printed text string 121 may provide additional identification. In this case, the text string 121 is interpreted from the image captured by the CCD camera 125 using optical character recognition (OCR). Many such OCR programs are commercially available, such as TIGER OCR from Cognitive Technology Corp. (Corte Madera, Calif.). As shown in FIG. 4d, more than one type of symbology may be simultaneously employed, providing support in case one of the symbologies is obscured or damaged.

There are a large number of different potential visible symbologies. Other examples include printed text, standard bar codes, or a bulls-eye arrangement of concentric circles where the presence or absence of each ring indicates a separate digit in a binary number. With a bar code or certain other symbologies, the lens 107 and camera 125 assembly could be replaced with a laser scanning mechanism as is frequently used in bar code scanners.

The identifier badge 103 and its incorporated symbology (in this case, circles 113, 115, 117, and 119, and the printed text 121) would need to be visible to the lens 107 and the camera 125 in order for detection and remote identification to succeed, as would also be required for the badge 103 of the light transmission remote identification of FIG. 4c. This places a constraint on the location of the badge 103, the orientation of the patron 43, and the requirement that the badge 103 not be obscured by clothing or other subjects. In contrast, the signals of the RFID and sonic identifiers depicted in FIGS. 4a and 4b need not be in direct line of sight of the corresponding detector.

Direct Subject Recognition

The previous embodiments of remote identification all required the use of identifiers such as bracelets or badges, that are extrinsic to the subject being identified. The subject itself can be viewed for intrinsic characteristics that would permit identification. These intrinsic identifiers, which must be detectable remotely, include facial recognition and iris recognition methods.

FIG. 4e is a perspective diagram of a facial recognition remote identification system. The identifier is the face of patron 43, which is detected using the lens system 107 along with a CMOS camera 126. The image of the face of patron 43 is analyzed for features particular to that face, including the distances between different features (such as eyes, base of the nose, and the center of the mouth), and more abstract metrics such as the eigenface and eigenfeature decomposition of the face (see U.S. Pat. No. 5,164,992 to Turk and Pentland). Alternatively, recognition of person-specific iris features can be performed (see U.S. Pat. No. 5,572,596 to Wildes, et. al.). It should be understood that the CCD camera 125 of FIG. 4d and the CMOS camera 126 of FIG. 4e are functionally similar to one another, and the CCD camera 125 could be used effectively in the direct subject recognition of FIG. 4e and conversely, the CMOS camera 126 could be effectively used in the optical symbology recognition process of FIG. 4d.

In the case where optical symbology and direct subject recognition are used in the step of subject remote identification 31, the images used for recognition may be the same images obtained in the step of image capture 33. Thus, the images obtained in image capture 33 may be stored, and then their contents examined for optical symbology or facial features in the subsequent step of subject remote identification 31. In this case, in reference to FIG. 1, the step of subject remote identification 31 would follow the step of image storage 37. Alternatively, the remote identification 31 may be performed on a separate image from the one stored for distribution, or the subject remote identification may be performed using the image obtained during image capture 33 prior to identified image storage 37.

It should be understood that the detector in each of the embodiments shown in FIGS. 4a through 4e may be supplemented with or require a digital computer in order to interpret the detected signals, and compensate for environmental noise.

The Step of Image Capture 33

The means of electronically-recording the photographic image will, in the preferred embodiment, be a digital camera 63, generally incorporating a charge-couple device (CCD) or a CMOS image recording chip to electronically record the photographic image. The camera will generally be located at a point at which clear, unimpeded photographic images can be recorded of the patron 43. A trigger mechanism can accompany the camera, by which the camera is caused to capture the image when the patron is within the field of view of the camera. For example, in FIG. 2, the camera 63 is caused to acquire an image when the car 45 carrying patron 43 interrupts an infrared light beam 59. It should be noted that other triggering means are possible, including an electrical switch mounted on the rails 47 along which the car 45 travels, so that the switch is physically acted on by the car 45 in such a way to set the switch temporarily into a different state (for example, the weight of the car 45 closing a contact, or an electronic switch that responds to a magnet mounted on the car 45).

The camera 63 may be either in close proximity or distant from the means of remote identification. It is only a requirement of the system that the subject of the image be identifiable, and the manner in which patrons 43 are placed in front of the camera 63 may determine the physical relationship of the camera 63 to the means of remote identification. For example, in FIG. 2, because the car 45 is constrained to the track 47, and presuming that this and other cars 45 along the track 47 cannot switch positions, knowing which patron 43 is in which car 45, and in addition, knowing which car 45 is within the field of view of the camera 63, allows one to know then which patron 43 is within the field of view of the camera 63. Thus, the means of remote identification and the camera 63 may be distantly located from each other.

However, in other circumstances, the means of remote identification and the camera 63 would need to be in close physical proximity. For example, if the entertainment venue were to be a nature trail, or a ride using a mechanized car 45 in which the car 45 speed and location relative to other cars 45 is variable or under the patron's 43 control, patrons 43 could proceed at different rates through the site, arid their order within the venue might vary. In this case, having the means of remote identification and camera 63 in close physical proximity is necessary to properly match each photographic image with the proper patron 43.

The possibility of a substantial physical separation between the means of remote identification and the camera 63 is also valuable in those cases where the patron 43 velocity at the time of optimal image recording is so high as to preclude simple electronic or visual identification by the means of remote identification. This might occur, for example, in the case of a high-speed roller coaster. In such a case, the step of remote identification can take place when the patron 43 and ride transport are at rest or of sufficiently slow speed to facilitate identification.

In cases where the image is to be recorded while the image subject is not sufficiently illuminated by natural lighting, a source of additional, artificial illumination will be required. Such illumination may be either continuous, or may be a pulsed or strobe lamp, timed so as to provide proper illumination at the time of the image recording, perhaps in conjunction with a trigger mechanism such as that in FIG. 2, comprising the infrared transmission device 55, the receiver 57, and the infrared receiver 57.

In general, the camera 63 will record a color image of the patron 43 with an appropriate field of view to capture the patron 43. In certain cases, the field of view may be much larger than a single patron 43, in case the location of the patron 43 is not known with enough accuracy. In such cases, the field of view may encompass the area of uncertainty, and then other means may be used to locate the patron 43 within the frame. Such methods of identifying head locations within a larger frame are well-known in the art of machine-automated facial recognition. Alternatively, a single frame with a large field of view may include the images of many patrons 43. If each patron's 43 location is known with sufficient accuracy, a sub-frame within the single larger frame may be used as the image of a particular patron 43, and multiple individual patron 43 images could be collected from a single frame with a large field of view.

The Step of Identified Image Storage 37

Once camera 63 makes an electronic image of the patron 43, it is sent to the image storage device 71 via the storage controller 73. Because the image is captured electronically, it can generally be stored as a digital image. The preferred storage means would be a computer hard-disk array, which has the advantages of inexpensive cost, high-data throughput, and random-access storage and retrieval. Alternative storage means include magnetic tapes, volatile memory (RAM disks), and writable digital compact disks (CDs) or digital video disks/digital versatile disks (DVDs). While magnetic tape storage is relatively inexpensive, it has the disadvantage in that, as a sequential-access storage means, there is no ability to randomly access the information on the tape, resulting in generally slow image retrieval. Volatile memory allows for the quickest storage and retrieval, but tends to be higher cost, and the information could be lost in the event of a power outage. Digital compact disks currently are unable to support multiple writing and erasing, however this is likely to be overcome in the coming years, and such technology may someday be useful for the implementation of this technology. The photographic images may be digitally "compressed" in order to decrease the amount of digital memory required to store the images, as well as to increase the image transmission and retrieval rates. Examples of such digital compression techniques include that of Discrete Cosine Transforms (DCTs) as used in JPEG and MPEG compressions (see for example, U.S. Pat. No. 4,791,598 to Lio, Sun and Wu) or fractal compressions (for example, U.S. Pat. No. 4,941,193 to Barnsley and Sloan). Each image is stored in conjunction with the corresponding patron identification, as well as other relevant information that might be of interest to the patron (e.g. date and time, name of ride, etc.).

FIG. 2 indicates that the image and the identification are separately transmitted to the storage device 71. However, if the image storage device 71 is distantly located from the camera 63 and the remote ID reader 52, it may be advantageous to have the image from the camera 63 and the identity from the remote ID reader 52 be transferred over the same wire, rather than over separate wires 65 and 53. In such a case, the image and identity signals would need to be digitally multiplexed.

Figure 5:
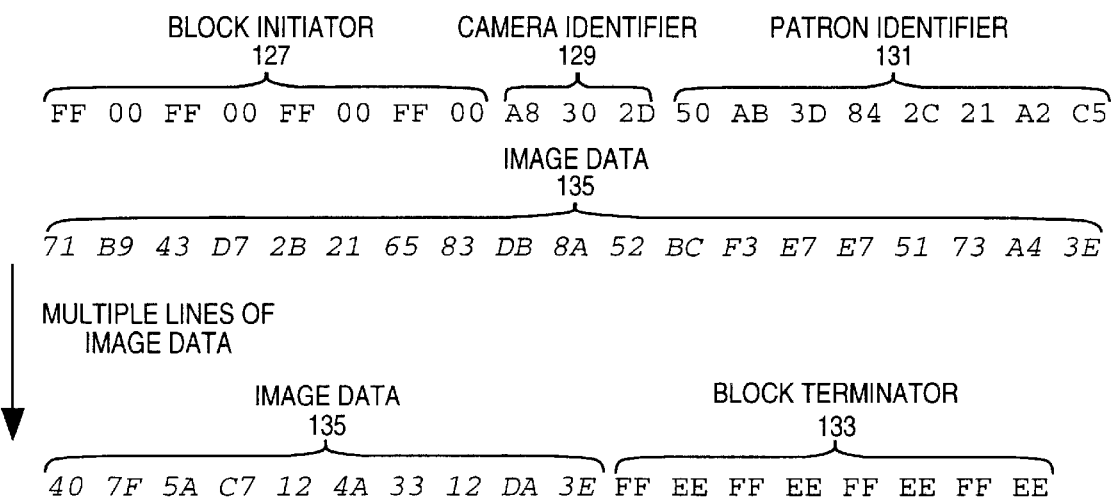
FIG. 5 is a logical schematic of a multiplexed digital signal comprising both identity and image information, for use in a person-specific imaging system where identity and image information are transmitted digitally on a common communications carrier.

FIG. 5 is a logical schematic of a multiplexed signal comprising both identity and image information suitable for transfer over a single transmission wire. Each alphanumeric is a hexadecimal block of digital information, wherein each hexadecimal pair represents a digital byte. A block initiator 127 signals the incoming identified image data stream, and comprises alternating FF and 00 bytes. A camera identifier 129 indicates the identity of the camera 63 from which the image was obtained. The camera identifier 129 would be of particular use when images from more than one camera 63 are stored in the same image storage device 71, thus identifying the camera 63, and therefore the corresponding ride, from which the image was obtained. The camera identifier 129 is followed by an 8-byte patron identifier 131, which represents the signal that was stored in the remote identification tag 49 and received by the remote ID reader 52 and is used to keep track of the patron in the image. This identifier 131 is then followed by a block of image data 135, which in general will be extensive, comprising thousands to millions of bytes of information, and is denoted in FIG. 5 as italicized text. The image data is followed by a block terminator 133, in this case comprising alternating FF and EE bytes (in hexadecimal notation) indicating the termination of the data. It should be understood that numerous alternatives are within the spirit of the present invention, and the order and constituents of each block represented in FIG. 5 may vary between embodiments. For example, the camera identifier 129 and the subject identifier 131 may be reversed in order, or placed at the end of the image data 135, rather than at the beginning. Additionally, a variety of different block initiators 127 and block terminators 133 may be used, or they may be omitted entirely. Also, the image data 135 may be raw digital image data, or it may be compressed using algorithms previously mentioned.

While the patron uses a single tag 49, remote ID reader 52 and cameras 63 are located at multiple fixed locations within the entertainment venue in order to capture a variety of images of the patron 43. It is also possible that a remote ID reader 52 and camera 63 could be mounted on a roving vehicle or carried by a photographer, which could take images of clients from a variety of locations. The storage of images will generally be at a single location or small number of locations. Thus, in general, multiple cameras 63 and remote ID readers 52 will communicate with a much smaller number of image storage devices 71.

The image can be sent from camera 63 to the image storage device 71 using standard digital communication technology. Because of the substantial size of the images to be sent, as well as their potentially large number, high-data transfer rates will be preferred. Such communication means could include many of the technologies in wide use in local area networks (LANs), including fiber optics and Ethernet. Alternatively, microwave or radio transmission means may be used. Examples of such wireless links are described in U.S. Pat. No. 4,097,893 to Camras and U.S. Pat. No. 4,916,532 to Streck et al. In certain venues, such as a public street, telephone lines might also be employed. At a single entertainment venue, multiple communication means could be employed simultaneously to link cameras 63 and remote ID readers 52 at different sites to the storage device 71.

The storage controller 73 is a digital computing device which governs the storage and retrieval of images from the image storage device 71. In general, images and identities will be received from image transfer wire 65 and identification transfer wire 53, respectively, at the storage controller 73. Alternatively, the storage controller 73 will extract the identity and related information from the image information if the data are multiplexed as in FIG. 5. The storage controller 73 will then place the images and information on the storage device 71 within a database structure that allows for easy search and retrieval of the image and data.

It should be understood that in general, there will be a number of locations at which images will be captured and subjects remotely identified. This information from multiple locations will in general be stored :at only one or a few locations for later retrieval. Thus, there will frequently be multiple identification transfer wires 53 and image transfer wires 65 input to each storage controller 73.

In many amusement park rides or theme park activities, patrons are closely positioned, as in a roller coaster. Thus, each image captured by the methods of the present invention may contain images of more than one patron 43. In this case, the identifiers for each of the patrons within each frame will be stored along with the image. This storage is easily handled by most relational databases, in which the data for each image is associated with bi-directional pointers or links with each patron 43 registered on the system. This means of storage prevents the need to store the voluminous image data separately for each patron 43 represented in the single image.

The Step of Image Distribution 39

The patron 43 will access the stored photographic images at image distribution stations 77, which may be physically integrated into kiosks 75 or alternatively be located in a building. The distribution station 77 will generally incorporate a means to identify the patron 43 by incorporating an integral remote identification device 51. Once the patron 43 is identified, the images corresponding to the patron 43 may be retrieved from the image storage device 71, and the images projected onto the viewing screen 85 for the patron to review. The viewing screen 85 could either be a standard computer screen (e.g. cathode ray tube, or an active or passive matrix display) configured for the purpose, or could be a standard or projection television screen. At the distribution station 77, the patron could perform certain actions such as:

printing an image, manipulating the image to produce special photographic effects such as adjusting contrast or color, cropping, enlarging, etc., adding or subtracting content to the image, such as images of theme park mascots or written information about the time and date or ride name, adding an image to or deleting an image from an "album" to be produced, printing an image on a particular memento (for example, a mug, a certificate, a greeting card, a T-shirt or other clothing), sending the image to an electronic address (for example, a FAX machine using telephone communications or an electronic mail Internet address) of the client's choice, generating a digital copy of the photographic images on either standard computer storage means (diskette or CD) or standard digital photographic formats (e.g. the Kodak PhotoCD format), providing photographic slides for the client, or providing photographic negatives for subsequent printing by the client.

In a standalone embodiment, the distribution station 77 could include means for accepting money from the client, using one or both of a cash payment slot or credit card payment slot. Furthermore, the image could be printed within the distribution device, and deposited with the client through the image distribution slot 87.

Multiple images of a patron 43 could be collected and packaged as an album. Also, if patrons are visiting the entertainment venue in a group, their photographic images could be collected together into a single album, even if their paths within the venue are divergent. This may be handled by allowing multiple patrons within a group to carry tags bearing the same digital identifier, so that requesting images corresponding to a single identifier would retrieve images from all group members. Alternatively, each patron could bear a different identifier, but the image storage device could then contain additional information about which patrons belong to a given group, so that image retrieval could be performed on a group basis.

Figure 6A:
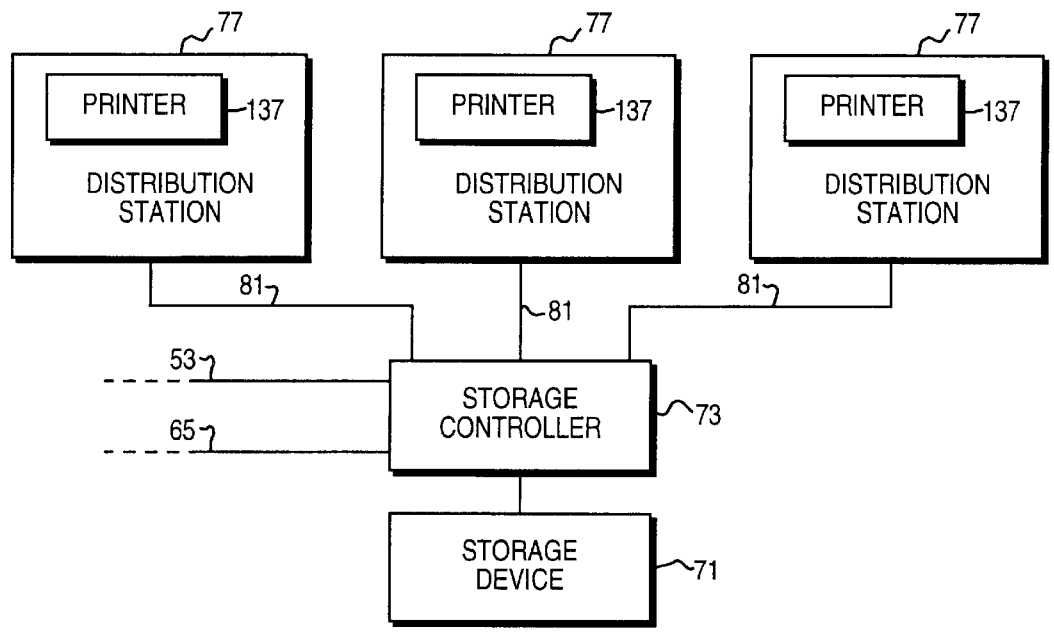
FIG. 6a and FIG. 6b are block schematics of two different methods of integrating printing into image distribution in a person-specific imaging system.
Figure 6B:
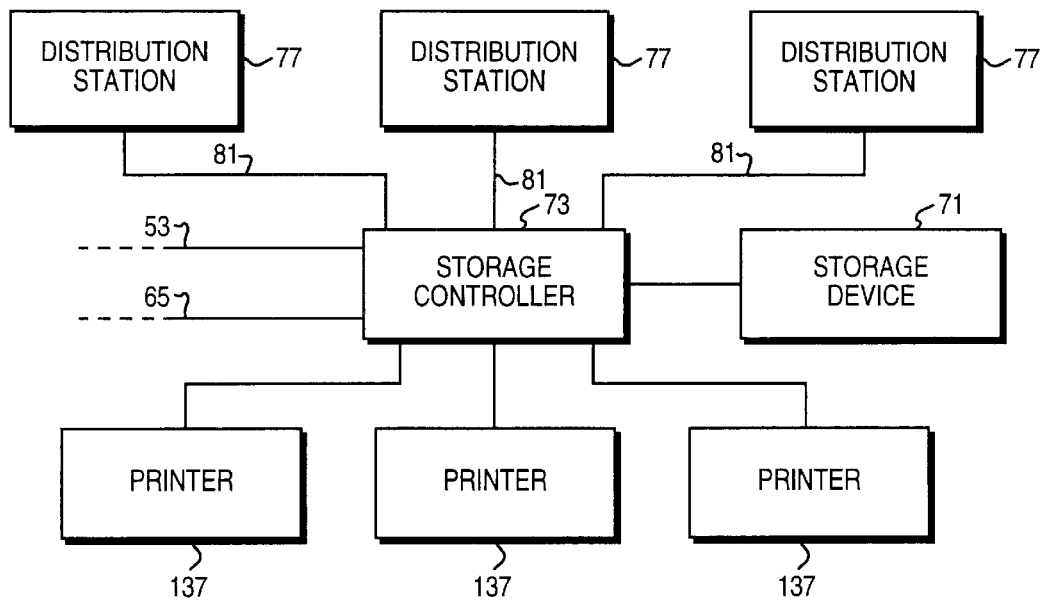

The sites of client interaction and the distribution of materials may vary. FIG. 6a and FIG. 6b are block schematics of two different methods for integrating printing into distribution. FIG. 6a denotes the distribution scheme as shown in FIG. 2. Data from the remote identification reader 52 is received over identification transfer wire 53, and the image is received through image transfer wire 65, where these two pieces of information are transferred by the storage controller 73 to the storage device 71. Distribution stations 77 are connected to the storage controller by the distribution cables 81. Within each distribution station 77 is a printer 137 for the production of a printed image for delivery to a patron 43 at the distribution station 77. The distribution cable 81, it should be noted, must allow for bi-directional communication, in which requests for images are sent from the distribution station 77 to the storage controller 73, and images are sent from the storage controller 73 back to the distribution station 77.

FIG. 6b denotes an alternative distribution scheme in which the printers 137 are not located at the distribution station 77. In this case, the distribution station 77 is used only for patron 43 interaction, where images are reviewed and selected. Requests for printing are sent from the distribution station 77 to the storage controller 73. The storage controller 73 retrieves the requested image from the storage device 71, and then routes the image to a suitable printer 137 for printing. The suitability of a particular printer 137 may be determined by the characteristics of the printing output specified, such as the size of the print, or the substrate on which the print is made (ceramic mugs, metallic films, fabrics or posters). Alternatively, the printing resource may be chosen on the basis of its availability. This distribution scheme effectively utilizes printing resources, which can be fully occupied with requests from a large number of distribution stations 77, allowing for economies of scale. For instance, photographic image albums might be best produced on high-volume machinery, which, may have advantages of higher speed and lower cost, and may additionally have special features, such as automatic binding.

In many cases, printing may be performed at times distinct from patron 43 interaction at the distribution station 77. For example, the patron 43 may choose images at the distribution station 77, and the images may be transferred to the appropriate medium (paper, T-shirt, or mug) at a later time for delivery to the patron 43, either later in the day or on a different day, possibly through mail delivery.

It should be noted that image distribution may be effected by alternative means that do not involve specialized hardware such as the distribution station 77. For example, images corresponding to a patron may be compiled in rough or size-reduced format, such as a photographic proof sheet, which could be sent to the patron 43 at home. The patron could then select image for purchase, and order these images via telephone, mail order, or Internet transaction. In this embodiment, however, the duration over which the images will have to be stored may be weeks or months, necessitating an inexpensive and accessible means for long-term image storage. It should be noted that since a database is generally maintained which associates which patron 43 corresponded with which tag 49 or which code stored on a tag 49 on a specific date or at a specific time (e.g. step 138 in FIG. 3), images stored for considerable periods of time can still be associated with the corresponding patron 43.

Device Configuration

In the previous sections, a number of devices performing different steps of the present invention have been shown, such as the remote ID reader 52, the camera 63, the storage controller 73 and the storage device 71. It is within the spirit of the present invention for two or more of these devices to share a common physical enclosure, or even to share common electronics and other components. Because of their natural physical proximity in the present invention, and the requirement for tight functional cooperation, the remote ID readers 52 and the cameras 63 may be partially or totally integrated. This integration may also be convenient for the storage controller 73 and the storage device 71.

Because of the demands for precise timing and cooperation between different devices, as described above, the use of digital computing devices, including dedicated microprocessors and computers, is useful in the operation of many of the devices that participate in the operation of the present invention. For example, the camera 63 may be effectively coupled to a computer, perhaps through the use of a "frame grabber" card (from Data Translation of Marlboro, Mass., or Matrox of Dorval, Quebec, Canada), so that images from the camera 63 can be buffered prior to transmission over the image transfer wire 65. Furthermore, the computer could take input from the remote ID reader 52, and then multiplex the identification with the image data in the manner described in FIG. 5, for transfer to the storage device 71.

It is also understood that the links between devices, including image transfer wire 65, identification transfer wire 53, and distribution cable 81, may include electrically conductive wires and cables, wireless transmission schemes, fiber optic cable, and infrared transmission schemes. The use of such transmission schemes is determined by a variety of issues, including cost, bandwidth, distance, intervening physical barriers, and environmental factors affecting electrical noise.

An Embodiment Employing Videographic Recording

Figure 7:
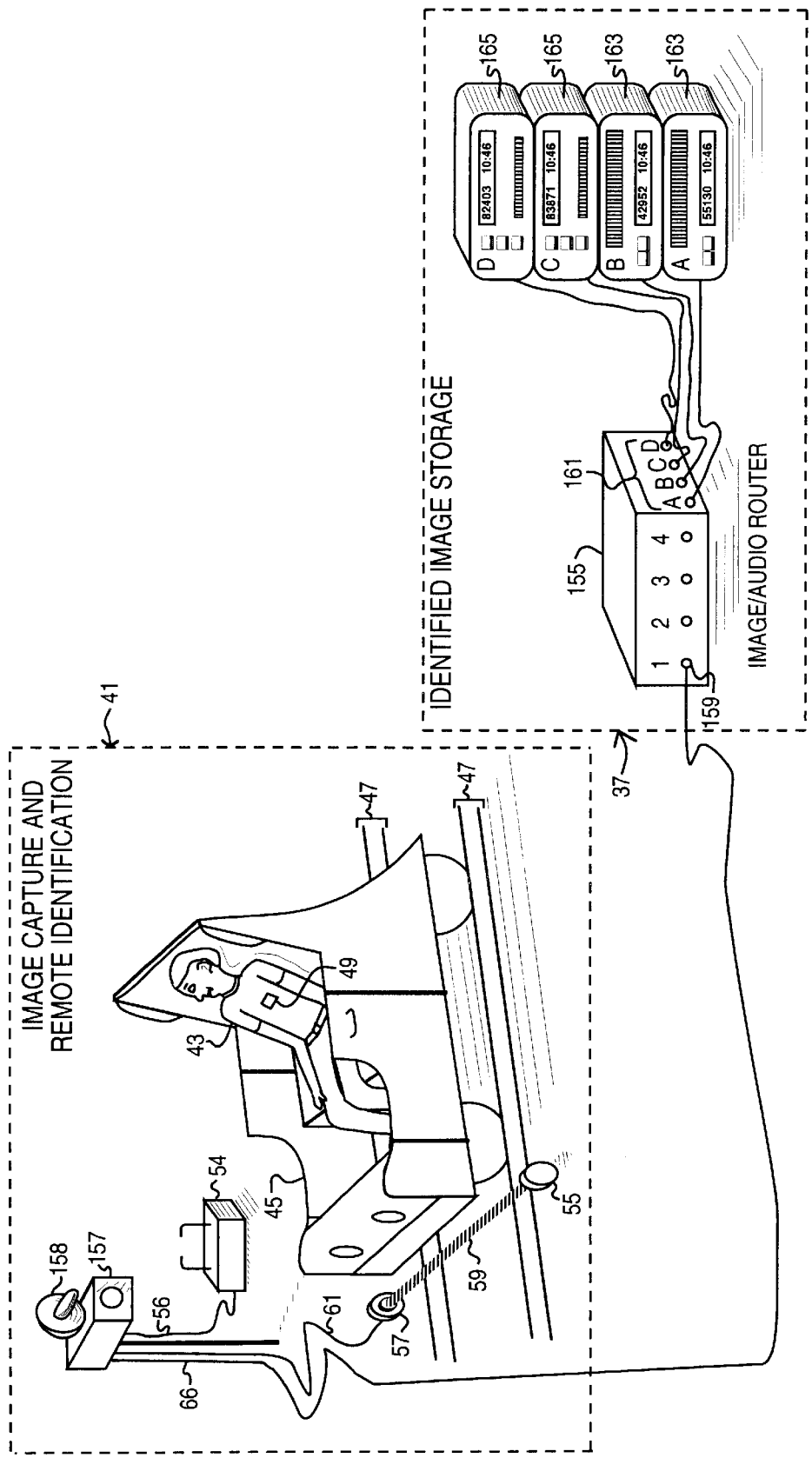
FIG. 7 is a perspective and schematic view of remote identification, image capture and image storage in a person-specific imaging system where video images are stored directly in an output format.

FIG. 7 is a pictorial schematic of an embodiment of the present invention where video images rather than single frame images are captured, and where the images are stored directly in an output format. The step of remote identification 141 is similar to that of FIG. 2 and FIG. 3, discussed above. However, instead of using the digital still camera 63, a videocamera 157 is used instead to capture videographic images. The term "videograph" is used to refer to videorecorded images comprising multiple image frames of continuous video recording. A directional microphone 158 is connected to the videocamera 157, and transmits its audio input to the videocamera 157. The RFID reader 54 is connected to the videocamera 157 via a local identification transfer wire 56, transferring the identification transmitted by the tag 49 to the videocamera 157.

The output from the videocamera 157 contains videographic images captured by the videocamera 157, the audio signals from the directional microphone 158, and the identifier obtained from the RFID reader 52. These signals may be multiplexed by the videocamera 157 and associated electronics (which may include a microprocessor-based computer) in a manner similar to that shown in FIG. 5. For example, the audio information and identifiers may be placed either in the space between individual lines (rows) of video data, or in the interframe spaces. This multiplexed data is transferred via videographic image transfer wire 66 to an image/audio router 155, which accepts input from the videographic image transfer wire 66 at image input connector 159.

It should be noted that numerous configurations of data collection and transfer are within the spirit of the invention. For example, discrete transfer wires could transfer information individually from the videocamera 157, the directional microphone 158 and the RFID reader 54 to the image/audio router 155, without the need for data multiplexing. Alternatively, the directional microphone 158 could be integral to the videocamera 157. In addition, instead of the multiplexing taking place within the videocamera 157, requiring specialized hardware within the videocamera 157, it might be convenient for a separate local controller to accept input from the various devices (the videocamera 157, the microphone 158 and the RFID reader 54) and perform the multiplexing, prior to transfer over the videographic image transfer wire 66 to the router 155.

A plurality of videorecorders 163 and DVD recorders 165 are connected to the image router 155 through a plurality of router output connectors 161 (A–D), to accept the image inputs and place them on a permanent output device, in this case an analog format videotape for the videorecorders 163 and DVD disks for the DVD recorders 165. The image router 155 takes the identification signal, and decides which videorecorder 163 or DVD recorder 165 to route the image. During a specified period, perhaps for hours, a day, or a few days, a specified videorecorder 163 or DVD recorder 165 would be assigned to a specific patron 43 identifier, and all images tagged with that identifier would be sent to a specific output recording device. For example, the DVD recorder 165 labeled C might be assigned for the period of a day to a patron 43 with a digital identifier 83871, and all pictures with that identification, from any of the many camera sources in a theme park connected to router 155 through any image input, connector 159, would be routed to videorecorder C through the appropriate C-labeled output connector 161. While only four input and output connections to the router 155 are shown in FIG. 7, the number of connections in a practical implementation could reach hundreds, thousands or more.

It is within the spirit of the current invention for the signals from videocamera 157 to be transferred via videographic image transfer wire 66 either in digital or analog format. Furthermore, depending on the format of the image signal over the videographic image transfer wire 66, the image router may have to include either a digital-to-analog converter (if the videocamera output is digital and the output format is analog, as for a videorecorder 163) or analog-to-digital (if the videocamera output is analog and the output format is digital, as for a DVD recorder 165).

The storage of images in an output format can be practiced as well with single frame image capture. For instance, instead of storing images prior to printing, all images may be printed and stored in association with the patron 43 identity within the image (e.g. printed on the back of the image, or storing the image in a particular slot in a storage rack). Alternatively, the information may be transferred directly to the patron 43 Internet address. However, the method is particularly convenient with regard to videographic images. In such cases, the amount of image data is extremely large, and the required temporary image storage device may be correspondingly expensive, so that recording the images directly on a permanent storage format may be economically more attractive.

Figure 8:
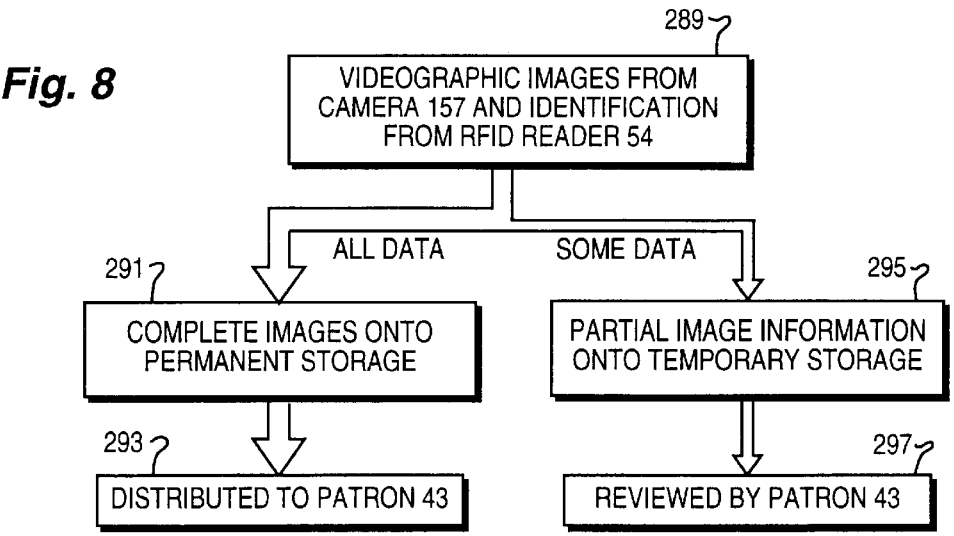
FIG. 8 is a block schematic of data flow in a person-specific imaging system, whereby segments of information are stored in a temporary storage means for the patron to preview.

It should be noted that this embodiment does not generally include a separate means of allowing the patron 43 to pick and choose from among images at a distribution station 77. Instead, because the images pertaining to the patron 43 are stored in permanent format, the patron 43 must simply choose whether or not to purchase the permanent output. FIG. 8 is a block schematic of data flow for an embodiment of the present invention, whereby segments of information are stored in a temporary storage means for the patron 43 to preview the stored images, without requiring all of the information to be easily available from permanent storage. A collection of images 289 from the videocamera 157 and the identification from RFID reader 54 are transferred in their totality to permanent storage. As a collection of permanently stored images 291, this data in its entirety is made available for distribution in a distribution step 293 to the patron 43, but large portions of the image collection 289 may be unavailable for the patron 43 to review prior to the distribution step 293. However, a subset of the image collection 289, perhaps single frames or a short segment from a videotape, are collected as temporarily stored images 295 which are stored on as temporary storage device. These temporarily stored images 295 are made available for the patron 43 in a review step 297, wherein the patron 43 reviews the temporarily stored image subset 295 of the permanently stored images 291 to determine whether to purchase the permanently stored images 291. Once the patron purchases the permanently stored images 291, the temporarily stored images 295 may be overwritten or deleted.

An Embodiment Involving Physical Transfer of Images and Identifiers

Figure 9:
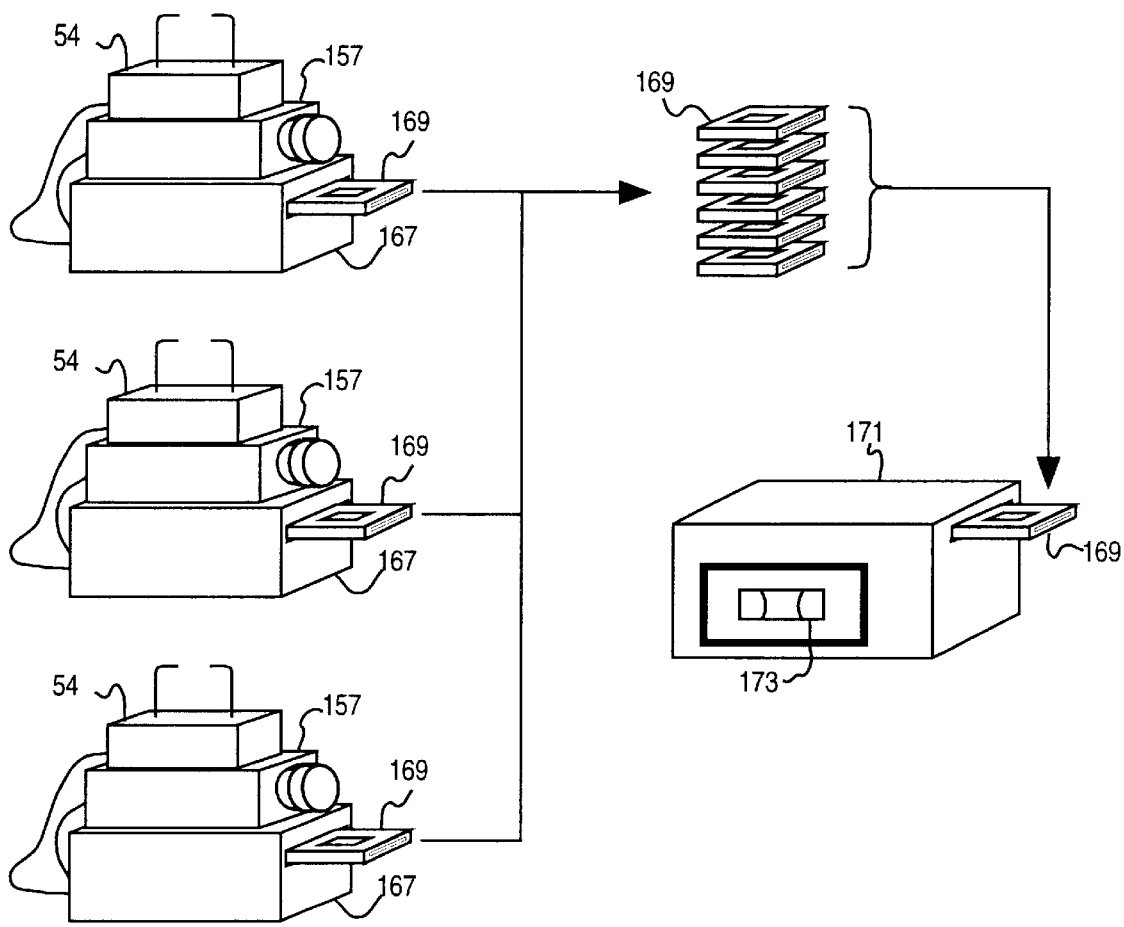
FIG. 9 is a perspective and schematic view of remote identification, image capture and image storage in a person-specific imaging system utilizing temporary storage devices local to image capture and remote identification means, wherein the stored information is physically transferred to a central identified image storage device.

The previous embodiments of the present invention involve the electronic transfer of data from the image capture and remote identification means to a common identified image storage device. In certain venues, the electronic communication between distant sites may be expensive or inconvenient. FIG. 9 is a schematic of an alternative system configuration utilizing storage devices local to image capture and remote identification means, wherein the stored information is physically transferred to a central identified image storage device. Multiple videocameras 157 and their associated RFID readers 54 are each connected to a local temporary storage device 167. The temporary storage device 167 utilizes a removable storage medium 169 on which both the image information from the videocamera 157 as well as the identification information from the RFID reader 54 is stored. The removable storage medium 169 may comprise a removable magnetic disk, a magnetic tape, or other such medium which may store electronic information and be physically transported separately from its recording electronics.

At intervals of minutes or hours, the removable storage medium 169 is removed from the temporary storage device 167 and physically transported to a central storage device 171, where the information from other removable storage media may be collected. At this point, the information from the removable storage medium 169 is transferred to a central storage medium 173 containing the information from a plurality of removable storage media 169.

It should be noted that other such configurations are within the spirit of the physical transfer of data described above. For instance, instead of consolidating the information from a plurality of removable storage media 169 onto a single central storage medium 173 as shown in FIG. 2, a plurality of central storage devices 171 may be employed, each of which reads the information from a removable storage medium 169 for use in the distribution of images to patrons 43. For example, in a central printing or videotape or DVD production facility, requests for images corresponding to individual patrons 43 could be transmitted to multiple central storage devices 171, which would then send the images to the appropriate printer 137, videotape recorder 163 or DVD recorder 165.

Data Formats and Data Flows

Analog Data

A variety of image, audio and identifier formats and corresponding transfer protocols are envisioned in the present invention. FIG. 10a is a block diagram indicating a flow of data that employs transfer of the audio and image data in the analog state. Analog image data 179 and analog audio data 181 are captured of the patron 43. These data are multiplexed into a single data format of audio/visual analog multiplexed data 183. There are a number of forms of such analog multiplexing possible, and a common form is to encode the analog image data 179 in an amplitude modulated form, while the analog audio data 181 are encoded in a corresponding frequency modulated form. This is often used, for instance, in the transmission of television signals. This multiplexing may conveniently be performed by generally available circuitry at the location of the videocamera 157 and the directional microphone 158 of FIG. 7.

The analog multiplexed data 183 could then be transferred by coaxial cable, wireless transmission, or some other suitable transmission means to the image/audio storage router 155. The remote identifier in general is a digital identifier 185 that would be transmitted over a separate wire or transmission means to arrive at the appropriate storage location. To store the identifier along with stored audio/visual multiplexed data 189, the digital identifier 185 may be encoded by the physical location of storage. For example, if the identifier 185 corresponding to audio/visual multiplexed data 183 indicates that the audio/visual data 183 is for a given patron 43, then the data would be stored at a location, for example the videotape recorder 163 or a DVD recorder 165 corresponding to that patron 43. A given storage location would be exclusively used by the patron 43 for their images during their stay at the entertainment venue. The identifier 185 is no longer kept in either digital or analog format, but is encapsulated as a location encoded identifier 187 based on the location at which the analog stored audio/visual data 189 is stored. All data transferred to that location corresponds to a single patron 43, and therefore the multiplexed data 185 corresponding to a given patron 43 can be retrieved simply by going to the recorder 163 or 165 corresponding to that patron 43.

It should be noted that the analog image data 179 could optionally originate as digital image data 175, and be converted by a D/A converter to the analog state. Likewise, the analog audio data 181 could originate as digital audio data 177, and be converted by a D/A converter to the analog state. Furthermore, the digital identifier 185 could be converted into an analog format, where it could be transferred directly with the corresponding analog multiplexed data 183. For example, the identifier 185, now in analog format, could be transferred with the analog image data 179 in amplitude modulated form as interframe analog data.

Digital Data

Figure 10B:
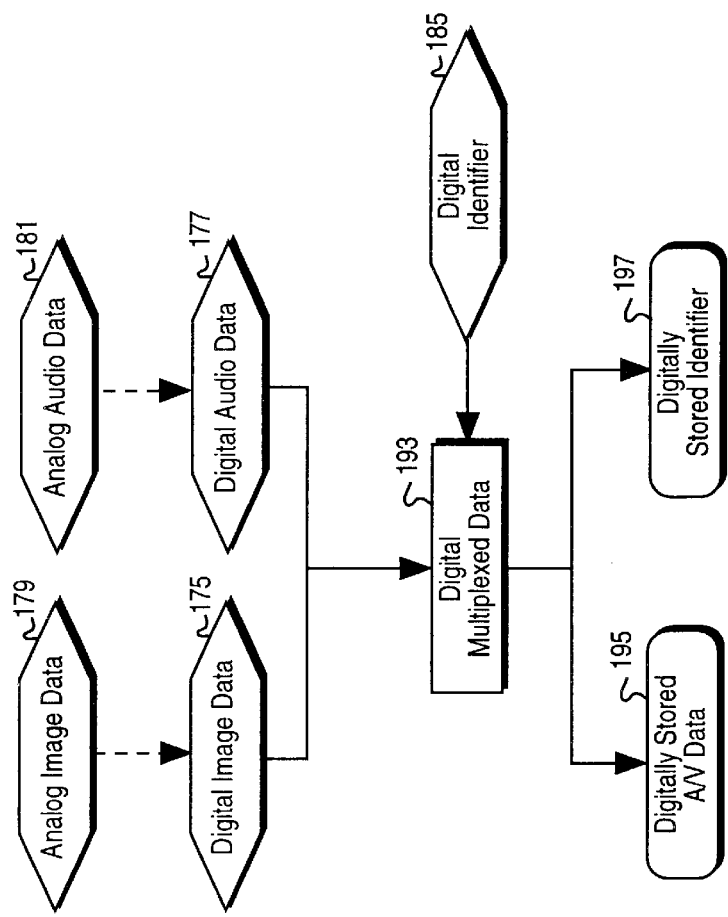
FIG. 10b is a block diagram indicating flow of data in a person-specific imaging system that employs transfer of the audio and image data in the digital state.
Figure 10A:
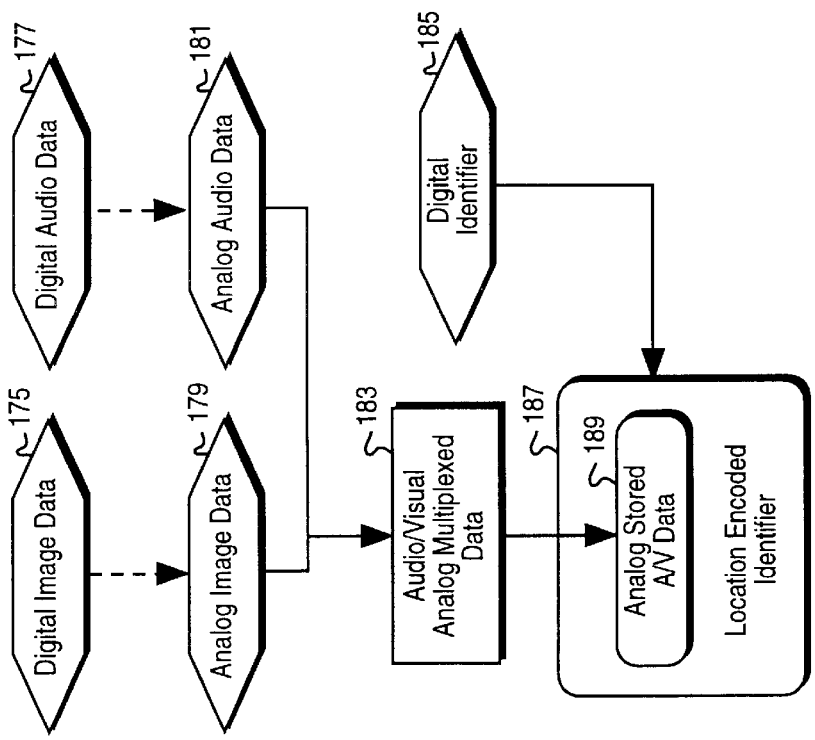
FIG. 10a is a block diagram indicating flow of data in a person-specific imaging system that employs transfer of the audio and image data in the analog state.

FIG. 10b is a block diagram indicating a flow of data that employs transfer of the audio and image data in the digital state. The digital image data 175 and the digital audio data 177 are captured of the patron 43. These data are multiplexed along with the digital identifier 185 into a single data format of digital multiplexed data 193 comprising audio data, visual data, and identifier data. This multiplexing may be similar to that of the single image multiplexed data shown FIG. 5, with provisions made for the encoding of audio data. For instance, a large, continuous block of audio data might accompany each image transferred. Alternatively, smaller fragments of audio data, even single bytes or double bytes of audio data, might be placed at the end of each horizontal line of image data. With images transferred at a conventional 60 frames a second, and 250 or more horizontal lines per frame, this provides sufficient data bandwidth to pass an audio signal of acceptable quality. This multiplexing may conveniently be performed at the location of the videocamera 157 and the directional microphone 158 of FIG. 7.

The digital multiplexed data 193 could then be transferred by digital transmission wire, wireless transmission, or some other suitable transmission means to a digital storage means, where the audio and visual and identifier data could be stored in a multimedia database as separate digitally stored AN data 195 and a digitally stored identifier 197.

Transmitting and storing digital data has certain potential advantages. For example, digital data may be highly compressed at its source, reducing the amount of data transfer. Furthermore, the data can be transferred with correcting noise reduction technologies. Also, once the data is stored in a digital format, modifications to the images using standard digital techniques can be easily applied.

It should be noted that the digital image data 175 could optionally originate as analog image data 179, and be converted by an AID converter to the digital state. Likewise, the digital audio data 177 could originate as analog audio data 181, and be converted by an A/D converter to the digital state. Furthermore, given the large volume of audio and visual data, after transfer of the digital data to the storage means, it may be useful to convert the data to analog format using suitable D/A converters, and to store the data in analog formats as shown in FIG. 10a.

Placement of the Remote Identification and Image Capture Systems

In the previous embodiments, the image capture system and the remote identification system are located at fixed positions, and are activated as the patron comes within range or view of these systems. In certain cases, particularly when the patron is conveyed through a ride, it may be difficult or inconvenient to place either the remote identification system or the image capture system in a fixed location. For example, if the range of the tag 49 carried by the patron 43 is small, the remote identification reader 52 may not be easily placed close enough either to activate the tag 49 or receive its identification signal. Furthermore, if the conveyance is moving, the duration of a videograph taken from a fixed location may be of too short a duration, and may require the videocamera 157 to pan in order to keep the patron 43 visible for an acceptably longer period of time. As an alternative to a fixed placement, the remote identification system or the image capture system may be placed on the ride car 45.

Figure 11:
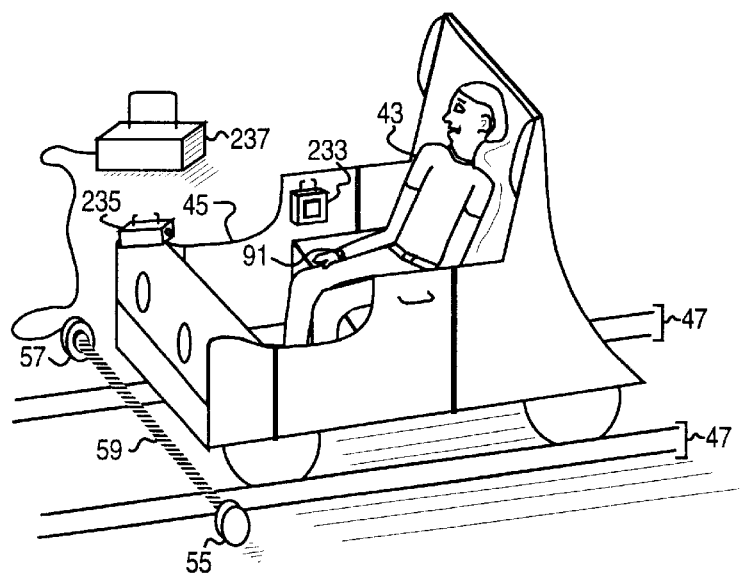
FIG. 11 is a perspective and schematic view of remote identification and image capture in a person-specific imaging system wherein the remote identification means and the image capture means move substantially in concert with the patron.

FIG. 11 is a perspective view of a system wherein the remote identification system or the image capture system move substantially in concert with the patron 43. The patron 43 is carried on the amusement ride car 45. The patron 43 wears an RFID transmitter 91 on a wrist bracelet, which is stimulated to transmit by mobile remote identification reader 233, which also receives the identification signal from the RFID transmitter 91. A mobile videocamera 235 is also mounted on car 45, and is placed so that the car 45 occupant is always within its field of view. In order to meet this requirement, the remote videocamera 235 may employ a special lens with a wide field of view.

Because the mobile remote identification device 233 and the mobile videocamera 235 are located on the car, 45, the identifier and the images from these devices, respectively, must be able to be transferred to fixed ground locations. This may be accomplished by a variety of means. For example, in FIG. 11, both the mobile remote identification device 233 and the mobile videocamera 235 function as transmitters, which transmit their data to a fixed receiving station 237, which receives both videographic image data and identifier data. Reception is induced when the car 45 interrupts the path of the infrared light beam 59 emanating from the infrared transmission device 55 and received at receiver 57. In order to reduce the different simultaneous sources of information that must be received by the fixed receiving station 237, the mobile remote identification device 233 and the mobile videocamera 235 may be connected by a wire, so that the identifier can be passed to the mobile videocamera 235 for incorporation into a multiplexed data format for transmission to the fixed receiving station 237 in one data transfer.

Alternatively, data from the mobile remote identification device 233 and the mobile videocamera 235 may be stored on the car 45 in a suitable format (e.g. a videotape), and retrieved at regular intervals in a manner described in FIG. 9.

Embodiment s of the present invention have been described in which the camera and the remote identification device are either both fixed in location, or which move in predetermined paths with respect to the patron 43. In certain cases, it may be useful to combine fixed remote identification readers 54 with mobile cameras 235 or mobile remote identification readers 233 with fixed videocameras 157.

Furthermore, it may be useful in cases to have mobile remote identification readers 233 and videocameras 235 that move in variable, not pre-determined paths. For example, in a themed amusement park, patrons may want to have their pictures taken with actors dressed in cartoon or other costumes by roving photographers. The photographer could carry a mobile remote identification reader 233, and capture images with a digital camera which can either transfer the data by wireless transmission or download the data from the digital camera onto a communications network. The photographer would not be required to remain in a fixed location, and could move without restrictions related to the placement of the remote identification device or camera.

In addition, it is not required that the patrons whose images are captured be conveyed by a ride to the site of a camera and remote identification device. For example, in front of a well-known attraction or an aesthetically impressive view, a camera and remote identification could be fixedly placed. As a patron moves into position, the remote identification device determines the patron identity, and then the camera captures a picture of the patron with the aforementioned view in the background. If the patron wishes to pose, instead of having a candid image captured, image capture could require a patron-initiated command, such as pressing a button that would activate the camera after a fixed delay.

Product Characteristics

Image Modification

Images obtained from the methods of the present invention may be modified for the interest and entertainment of the patron, so as to induce them to purchase the images. Such modifications can be performed on both static, single-frame images as well as videographic images. While very simple image modification programs can be performed while the image data is in analog format, most sophisticated modifications are most easily performed on images in digital format.

Figure 12A:
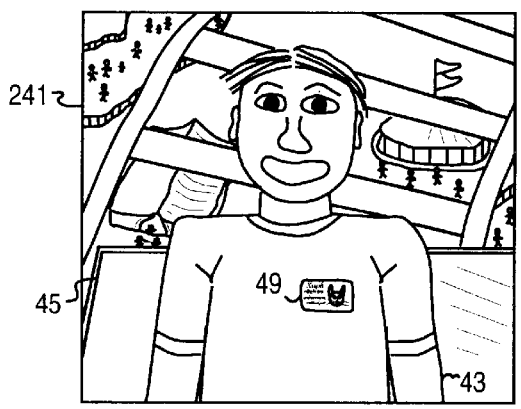
FIGS. 12a through 12e are a series of pictorial images demonstrating methods of image modifications that may be employed in a person-specific imaging system.

FIGS. 12a through 12e are a series of pictorial images including image capture and image modifications. FIG. 12a represents a single image from a sequence of videographic images of the patron 43 wearing the tag 49 on an amusement ride, such as a roller coaster. The image is surrounded by the image frame 241. The image includes parts of the car 45 on which the patron 43 rides, as well as background scenes from the amusement park. While this image may be of sufficient interest to the patron 43, the following images and descriptions will demonstrate how modified images may be created.

Figure 12B:
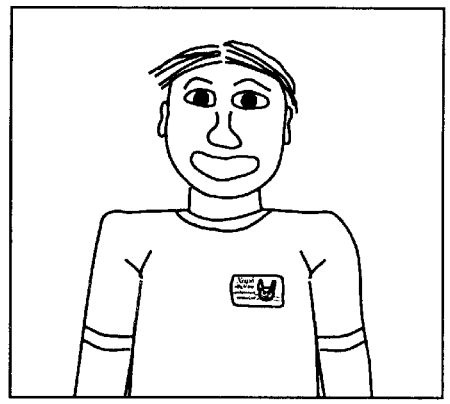

In FIG. 12b, the background elements of the image, including the car 45, have been eliminated from the image. This subtraction may be done by one or more of the following techniques. Firstly, because the mobile videocamera 235 which captured the image will generally be fixed in position with respect to the car 45, regions representing the car 45 are located in the same pixel locations in all frames throughout the day, and their images may therefore be eliminated from the frame. Secondly, the other background images are changing rapidly compared with the images of the car 45 and the patron 43, and these may be eliminated. The background images can also be eliminated on the basis that they may be somewhat out of focus given their distance from the mobile videocamera 235 relative to the; patron 43 and the car 45. In addition, the location of the patron's 43 face in the frame can be easily established using feature recognition programs mentioned above, and the body may be roughly estimated relative to the face, and then conventional edge detection programs can be employed to determine the extent of the patron's body. Pixels not corresponding to the patron are given predetermined color values that are reserved for background, which will be referred to hereafter as the reserved color value, whereas those pixels corresponding to the patron retain their original pixel color values.

Figure 12C:
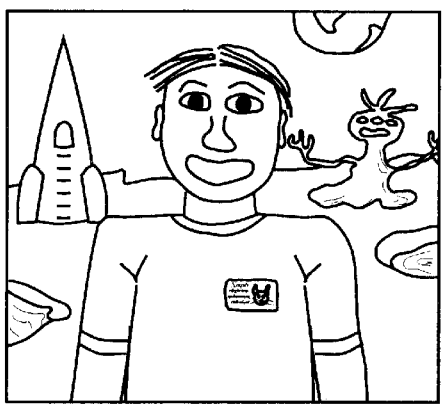

FIG. 12c demonstrates an example of the placement of the patron's image, extracted from the background as in FIG. 12b, into an unrelated background. In this case, the patron's image of FIG. 12b is placed on a background of a hand-drawn cartoon, in this case, a fantasy picture of another planet, including an alien. The contortions of the patron's face, taken out of context from the amusement ride, provide for entertainment. This is performed by merging the bit images of the cartoon and the patron's face, wherein pixels from the cartoon image take on the color values from FIG. 12b if and only if the color is not the reserved color value, and if the pixel has the reserved color value, it is replaced with the cartoon pixel color value.

Figure 12D:

FIG. 12d provides an example modification of the patron's image by replacing pixels corresponding to the patron with unrelated image pixels. In FIG. 12d, the patron's image is altered to place the image of a scar on the patron's cheek, images of earrings on his ears, the image of a patch over his eyes, the image of a bandanna on his head, and the image of a torn shirt on his body.

Furthermore, the image is placed in a filmed background from a sailing ship, in order to give the impression of the patron as a pirate on a pirate ship, using the methods of FIG. 12c. In order to perform the transformation of the patron's image, the patron's facial features (eyes, ears, nose and mouth) are analyzed using conventional facial recognition software, which locates and orients the features. Pixels representing the various facial modifications (scars, earrings, patch, and bandanna) are scaled and rotated according to the dimensions and placement of features, and then replace the pixels representing the corresponding regions on the facial and background images. Similar transformations can be performed for the image corresponding to the shirt, or alternatively, images recorded from an actor in appropriate clothes could be part of the background image, and only those pixels corresponding to the patron's head could be placed into the image. By this latter method, the image would correspond to that of the patron's head on another person's shoulders.

Figure 12E:
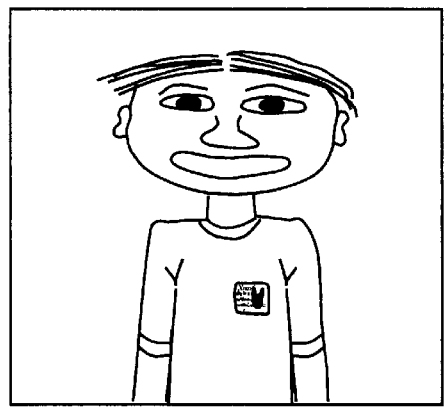

In FIG. 12e, the patron's image is removed from the background, as in FIG. 12b, and then the image is altered by distortion. In FIG. 12e, for example, the head is widened, and the body is narrowed. Such distortions are well known in the art of digital imaging and image modification, and generally involve not only the movement of specific pixels, but also the merging of pixel color values to ensure that the resulting images are smooth and without edge effects.

It should be realized that a wide variety of modifications may be made to the image according to the methods of the present invention, including:

modifying images to improve image quality (for example, altering image contrast or brightness), placing images from different recorded images into the same image so as to create the impression that various people or objects are together, or that the patron is located in a different environment, interspersing sequences of images with other sequences of images so as to create an impression of time flow and connectedness of action, and modifying the audio output by changing the frequency content or coupling audio output from one recording with an image from another recording.

Furthermore, more than one modification technique may be applied to the same sets of images in order to produce the desired effects.

Product Formats and Substrates

The method of the present invention creates images that may include both single image frames as well as videographic images, as well as accompanying audio traces. These images and audio traces may be unaltered recordings, or may have been modified according to methods such as those described in the previous section. The images may be produced in a number of different output formats and placed on a variety of substrates to improve their attractiveness to patrons, so as to induce them to purchase these images. The manner and variety of these formats and substrates are described below.

FIG. 13a is a block schematic of a distribution system for single images which incorporates a variety of different output devices. In general, single images will be stored as digitally stored image data 196 on a digital storage device 71 such as an array of hard drives. Connected to the image storage device 71 is a communications bus 199 over which image data is transferred selectively to a number of different output devices. The devices include the printer 137, which outputs printed images either as a paper image 209, or a plastic sheet image 213. Multiple paper images 209 may be collected and bound together to form an album 223.

Alternatively, the image data 195 may be transferred to a fabric printer 201 for placement on a fabric substrate such as a T-shirt 215 or a cap. The image might also be transferred to a ceramic transfer device 203 for placement on a ceramic mug 217, statuette, or other memento.

The images need not necessarily be converted into a physical format, but may be placed in an electronic storage format. For example, the image data 195 might be transferred to a Photo CD mastering device 205, which outputs a Photo CD 219, such as in the Photo CD format developed and distributed by Eastman Kodak (Rochester, N.Y.). Alternatively, the image data may be transferred to an Internet server 207 where it can be transmitted to the Internet address of the patron 43 as an attachment to electronic mail 221.

FIG. 13b is a block schematic of a distribution system for videographic images stored as analog data and which incorporates different output devices. An analog videograph storage device 218 contains analog stored videographic data 189, as described above. This data may be transferred directly to the videotape recorder 163, where it is placed on a videotape 229.

Alternatively, the analog data 189 may be transferred to either the Internet server 207 or the DVD mastering device 165 for transfer as electronic mail 221 or on a DVD disk 227, respectively. However, since the: Internet server and the DVD mastering device generally handle digital data, the analog data 189 must first be converted from the analog format to a digital format by A/D converters 225. Although shown in FIG. 13b as two A/D converters 225, these may be replaced by a single A/D converter which is switched between the different output devices.

FIG. 13c is a schematic of a distribution system for videographic images stored as digital videographic data 195 on a digital videographic storage device 220, which incorporates the same output devices as shown in FIG. 13b. As before, the image data are transferred to the Internet server 207, the DVD mastering device 165 and the videotape recorder 163 for the production of the electronic mail 221, the DVD disk 227 and the videotape 229. However, because the data is retained as digitally stored videographic data 195 on the digital storage device 165, the data can be directly transferred to the Internet server 207 and the DVD mastering device 165. However, since the videotape recorder 163 accepts analog data input, the digital data 195 must be converted first to analog format by a D/A converter 231.

Active Integration with Environmental Venue Operations

The previous embodiments of the present invention can be integrated seamlessly into the normal operations of entertainment venues, such as theme and amusement parks, so that image capture does not intrude on the entertainment that the patron obtains on the rides or at the activities of the venue. Indeed, the patron may well not be aware that image capture is taking place during the activity. The following modes of use of the present invention, however, provide active integration of image capture and remote identification into rides and activities, where the patron is both conscious of image capture, and actively participates in interaction with picture taking and review.

Reviewing Images as Entertainment

Figure 17:
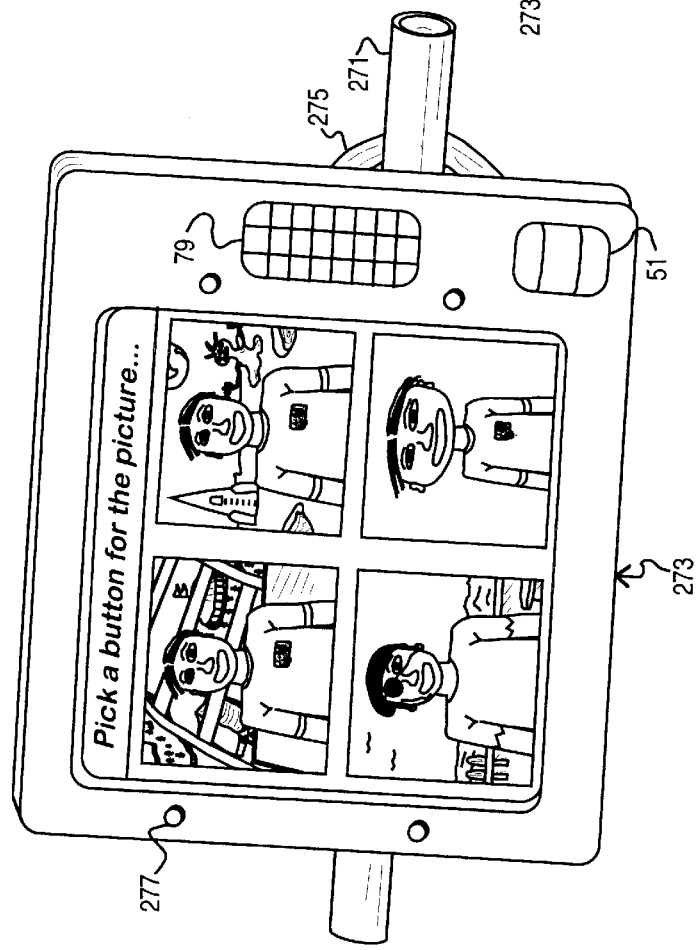
FIG. 17 is a perspective view of a review monitor for use in entertainment venue waiting lines for use in a person-specific imaging system.

FIG. 17 is a perspective view of a review monitor 273 for use in entertainment venue waiting lines. It should be noted that at many theme parks, especially during times of heavy use, patrons may wait for many hours in line waiting for their turn on a ride, at a show, or in an activity. During this time, they are generally not well entertained. The review monitor 273 is attached to a fixed object, in this case a horizontal pole 271 used as a barrier in crowd control. A number of straps 275 are used, but may be replaced by a wide variety of different placement fixtures. The review monitor 273 is placed on a line in such a way that it is visible to patrons 43 waiting in line, generally at moments when they are not otherwise entertained. The integral remote identification reader 51 integrated into the review monitor 273 senses the tag 49 worn by the patron 43 (not shown), and transmits the identity of the patron 43 to a central controller, such as the image controller 73 of FIG. 2. The image controller 73 places a number of images on the screen for the patron 43 to review. A plurality of buttons 277 may be placed on the review monitor in order to allow the patron 43 to select images to view. Information or directions may be communicated to the patron 43 either through words written on the screen, or through audible speech transmitted by the speaker 79 built into the review monitor 273.

Communication between the image controller 73 and the review monitor 273 may be mediated by a number of different means, including wireless transmission, fiber optics and digital or analog transmission over electrically-conductive wire. In FIG. 17, the horizontal barrier pole 271 is hollow, allowing the placement of wire and cable through the cable and to the monitor.

The review monitor 273 need not have a means of selecting images for purchase, although this could be easily arranged to have the equivalent of the distribution station 77 to be housed in the waiting line. However, the natural movement of patrons 43 within the waiting line generally inhibits decision-making. The review monitor, however, entertains patrons 43 waiting in line with images of themselves, still or videographs, perhaps modified as described above (see FIG. 12). Furthermore, the images inform the patron about which images are available for purchase, so as to increase the chances that the patron 43 will approach a distribution station 77 for image purchase.

In order to keep patrons in the waiting line moving, rather than staying to view their images, the review monitor 273 may display images of a given patron 43 for only a limited duration, and then present a blank screen until a new tag 49 identifier is detected by the integral remote identification reader 51. Since many of review monitors 273 may be in line, the patron 43 may have many opportunities for viewing their picture.

Image Capture and Display as Entertainment

Figure 18:
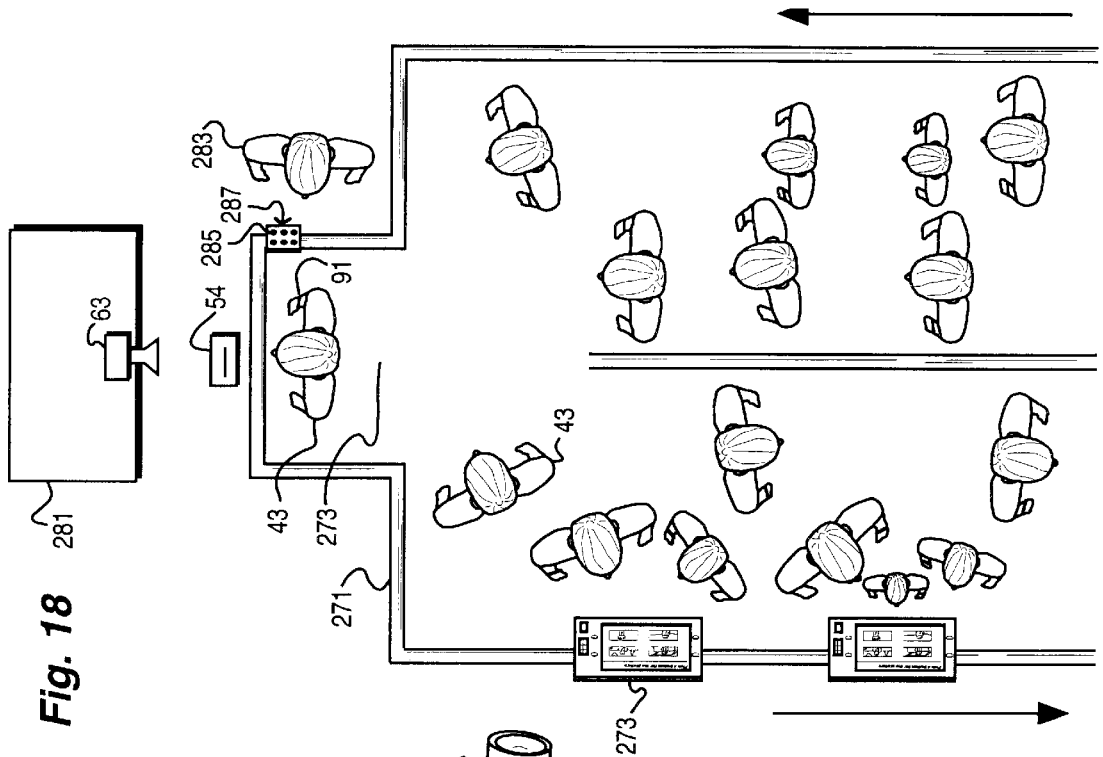
FIG. 18 is a top-perspective view of a waiting line in which image capture, modification and review are used to entertain patrons in a person-specific imaging system.

The act of picture taking, especially where the result is a modified image of the patron 43, can be very entertaining. The next two embodiments of the present invention integrate the act of taking and reviewing images an intrinsic part of the entertainment process. FIG. 18 is a top-perspective view of a waiting line in which image capture, modification and review are used to entertain patrons 43. Numerous patrons 43, each with an RFID bracelet tag 91, are in a waiting line, bordered by horizontal poles 271 similar to that shown in FIG. 17. Their direction of motion is shown by arrows on the left and right. At a U-bend in the waiting line, the poles 271 are arranged to form a pocket 279 in which the patron 43 closest to the pocket 279 steps. The RFID reader 54 is placed in front of the pocket, so as to identify the patron 43 in the pocket. The digital camera 63 sits on top of a large monitor 281, and captures an image of the patron 43. An entertainment venue operator 283 stands next to the pocket 279 in order to operate the system, and will generally press a button 285 located on a console in order to activate the image capture.

After the image is captured, it is modified to provide entertaining modification of the patron's image, as described above. The operator 283 may choose among different modifications using the console 287. This serves both to provide ever changing modifications to entertain the patrons, and furthermore may allow the use of modifications appropriate to the age or gender of the patron 43. As the modifications are made, they are displayed on the large monitor 281. The monitor 281 is of such a size, as well as being placed at such a height, that it is visible to many patrons 43, so that patrons 43 may view a variety of these transformations. The size of the monitor 281 may also be of such a size that views of multiple modifications may be displayed, or alternatively, that views of both the unmodified and the modified images be displayed for entertainment effect.

As patrons 43 leave the pocket 279 and face away from the monitor 281, their attention may be propelled forward by the placement of review monitors 273 (as described in FIG. 17) for review of the just-created images, as well as other images created at other times in the entertainment venue.

Given that waiting lines in some theme and amusement parks may extend to two or more hours, such image capture and display systems may be located at numerous turns in the waiting line, in order for patrons to have multiple opportunities for viewing others and themselves during this extended period. Furthermore, the image modifications used in a particular line may be chosen to have a theme consistent with that of the ride for which people are waiting.

The use of the remote identification methods (involving the RFID bracelet 91 and the RFID reader 54) is necessary to allow the patron 43 to purchase the images at some time later. Because of the requirements of maintaining movement in the waiting line, the patron 43 will be unable to purchase the printed images while waiting in line. Thus, the remote identification methods associate the patron 43 with the image, and permit the sale of the image to be made at a later time, as described above (see, for example, FIG. 2).

Task-Directed Image Collection

The previous embodiments of the present invention are used to obtain candid or posed images of the patron. The following embodiment, called task-directed image capture, captures images of the patron performing a sequence of tasks, which are then captured and modified for entertainment effect.

Figure 14:
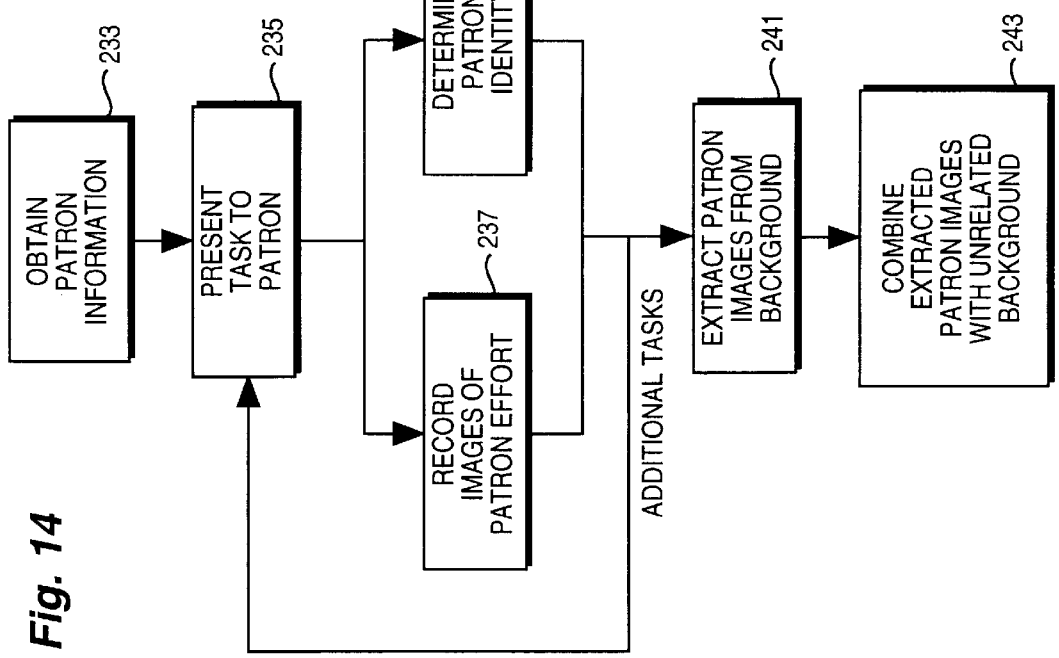
FIG. 14 is a block schematic of the steps of task-directed image capture as used in the present invention.

FIG. 14 is a block schematic of the steps of producing images via task-directed image capture (generally, these steps will be followed by distribution of the images to the patron 43). Usually, the patron 43 will be given a remote identification tag 49 in order to be able to remotely identify them during the process. In a first, information obtaining step 223, information is obtained from the patron 43 about their tastes and interests, so that images can be acquired and modified according to the patron's tastes and interests. The information so gathered would be available to the system in order to choose appropriate tasks for the patron 43, as described below. This step is considered optional if a single theme for modified images will suffice for all of the patrons, or if the output will be chosen by the system operator without input from the patron 43.

In a task presentation step 235, the patron is presented with a task to perform. The tasks presented to the patron can be of a wide variety, such as:

Moving an object on a shaft and using the position of the object to control computer-generated action images on a monitor.

Performing large-motion physical actions, such as jumping over a line or area on the floor.

Mimicking sounds coming from a speaker.

Attempting to blow a flame out.

Pulling on a cord.

The presentation of these tasks will generally be through a human guide, written signs, directions on a monitor, or audible commands projected through a speaker. These commands will also usually be given in the context of a challenge. For instance, for the first example given above of moving an object, the direction of a virtual space ship projected on a monitor could be controlled as it traversed a region of space filled with interfering object (e.g. virtual asteroids). Alternatively, the object could be to tickle an image of a laughing clown projected on a monitor in all the parts of his body, using a projected image of a feather. This illustrates that the same task site might have different tasks associated with the different tastes and interests of the patron 43, depending on the information gathered previously from the patron 43.

While the patron is performing this task, images of the patron's efforts are made in a recording step 237. The recording in general will be made without the knowledge of the patron, so that the camera will be mounted out of the normal direction of the patron's gaze, or the camera may be placed in a recess or behind a transparent shield with illumination controlled so that the camera is not easily seen.

Before, during or subsequent to the time that the patron is performing the task and images are being recorded, the patron's identity will be recorded by a remote identification device in a patron identification step 239. This allows the images captured in the recording step 237 to be linked unambiguously with each patron 43.

In general, the patron 43 will be asked to perform a number of tasks, from three to perhaps a dozen or more. These tasks may be scattered throughout an open area, or they may be located at different fixed locations within a directed path, such as in a passageway. In such a case, the patron would traverse the passageway, performing tasks as they are presented. Using this scheme, it is likely that a patron 43 would perform most or all tasks presented. For each task station, the patron 43 will be presented a task, images of the patron 43 performing the task will be captured, and the identity of the patron will be determined.

It should be noted that the order of the steps of task presentation 235, image recording 237 and identity determination 239 may differ without departing from the scope of the present invention.

At the conclusion to this set of tasks, the patron's image will be extracted from most or all of the images so obtained in an image extraction step 241. This is followed by the combination of those extracted images with appropriate background images in an image combination step 243, possibly in conjunction with some modification of the patron images, in order to obtain a videographic image of enhanced entertainment value. These steps will be described in more detail below.

Figure 15:
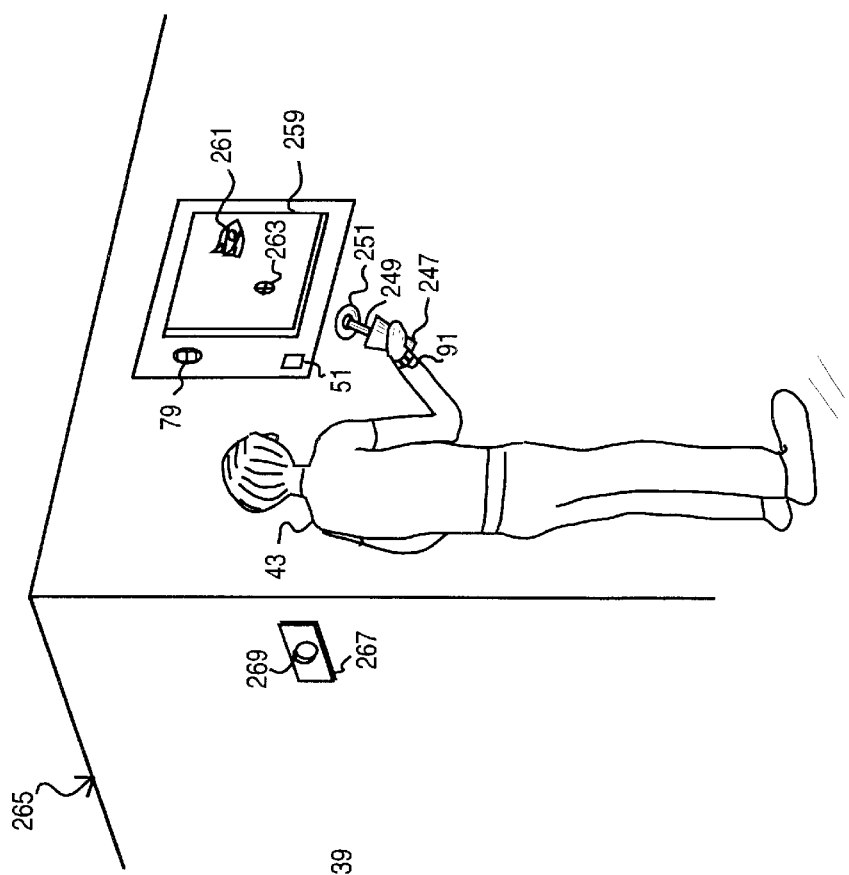
FIG. 15 is a perspective image of a patron at a task station engaged in responding to a task presented to the patron according to steps of FIG. 14.

FIG. 15 presents a perspective image of a patron 43 at a task station. The task station comprises a monitor 259 on which images are displayed. In the particular case shown, images of a crosshairs 263 and a spaceship 261 are depicted, although the images would be different at each task station or for different tasks at a given station. The patron 43 controls the position of the crosshairs 263 by moving a conical grip 247 mounted on a shaft 249, which interfaces with a gimbal mechanism 251, which determines the position of the crosshairs 263. The patron 43 is given instructions to keep the crosshairs 263 over the spaceship 261, and grasps and manipulates the grip 247 to do so. The instructions are given to the client in this case both by text on the monitor 259, but also through audible commands presented over the speaker 79.

While the patron 43 is performing the task, an integral remote identification reader 51 reads the bracelet-mounted RFID tag 91 worn by the patron 43. Furthermore, images of the motions performed by the patron 43 are recorded by a videographic camera 269 mounted in a recess behind a transparent glass frame 267, and with illumination controlled so that the camera is not easily noticeable to the patron 43. The camera is mounted on a wall 265 that is at an angle to the monitor 259, so that well-positioned images can be obtained of the patron 43 profile, as well as the patron's hand.

FIG. 16a is a side-view image of the patron's hand 245 as seen by the camera 269. The hand grips a rubberized, conical grip 247. The conical shape of the grip 247 ensures that patrons with different hand sizes can comfortably hold onto the grip 247. The grip 247 is connected by the shaft 249 to the gimbal control mechanism 251.

The grip 247 is moved to various locations by the patron 43, and these locations can be controlled by varying the task presented to the patron 43 on the monitor 259. For example, if there are insufficient images of the patron with the grip 247 in an elevated position, the spaceship 261 can be moved higher on the monitor 259, which will then induce the patron 43 to raise the grip 247 in order to keep the crosshairs 263 over the spaceship 261. Thereby, the camera 269 can obtain images of the patron holding the grip in a variety of different positions.

The image of the patron is then removed according to the methods described in previous embodiments. Such procedures can be assisted by the knowledge of where the grip 247 is at any time, since the position of the grip 247 is known in order to control the position of the crosshairs 263. Furthermore, similar to the procedures discussed above for other embodiments, the grip may be replaced with images of other objects. FIGS. 16b through 16d are perspective images that show the replacement of the image of the grip 247 with other objects. For example, in FIG. 16b, the image of the grip 247 is replaced with that of a fanciful gun 253. In FIG. 16c, the image of the grip 247 is replaced with that of a hilt 255 of a sword. In FIG. 16d, the image of the grip 247 is replaced with the image of a hand 257, so that the hands 257 and 245 seem to be shaking in a greeting, or being held in an amorous manner. As can be appreciated, these images could be used for various effects, creating different impressions. For example, the images in FIGS. 16b through 16d could be used in a war or mystery videograph, a medieval scene with knights and princesses, or an amorous scene, respectively. The actions of the patron's hand 245 could be controlled in the manner described above to be consistent with the actions in the different scenes.

In general, the product of task-directed image capture will be in videographic format (CD, videotape, DVD) containing a number of the modified task images. These images may be unlinked thematically, or they may be linked with an aesthetic or narrative theme. Examples of this might include a videographic story that includes the patron on a quest, or a music video that includes the patron interacting with a favorite music or film personality.

Benefits and Advantages of the Present Invention

The invention provides a number of advantages to entertainment venue operators who wish to provide images of patrons for patron enjoyment and purchase, including:

Because the use of remote identification allows the entertainment venue operator to collect a large number of pictures corresponding to each patron, and the amount of revenue to the operator will increase with the number of images available to the patron, the present invention provides the opportunity for greater revenues.

The patron may choose from a wide variety of potential images, rather than having only one or a small number of images taken at a single or small number of rides.

The images may be modified in order to increase patron entertainment. Furthermore, a number of different modifications can be made so that the patron can choose the most appealing image modifications.

The image modifications can be used to promote other commercial properties of the operator. For example, a task-directed image capture might include the introduction of material related to a music or film personality under contract to the entertainment venue operator, thereby enhancing the appeal of the personality to the imagination of the patron.

An album of still images or a videograph will contain many images of the patron enjoying the rides and activities at the entertainment venue. As such, it serves as an effective marketing tool to encourage repeat visits to the entertainment venue.

For patrons who either do not have or rarely use image capture equipment, or for those whose equipment is malfunctioning, the present invention allows the patron to obtain personal images where they otherwise would not. Furthermore, for all patrons, the personal images can be from scenes or perspectives that would be inaccessible to most patrons, since they would be achieved from locations within the ride itself.

Most videographic images obtained by individual patrons will jump from scene to scene without smooth transition, introduction or conclusion, making for a less enjoyable viewing experience. The method of the present invention allows for the operator to frame the images, pan and zoom, fade between scenes, and intersperse scenes of individual patrons with stock images related to the given entertainment ride, in such a way as to make a smooth, professional-looking videograph.

The present, invention allows printing numerous images for each patron, as well as organizing image capture to be able to handle large numbers of patrons. This in turn permits cost-effective and efficient printing of the photographic images on paper or mementos in a central location, whereby the printing can be carried out most cheaply and most quickly, taking advantage of economies of scale and centralized production.

Without a method of remote identification, image purchase most easily takes place at or near the time of image capture. In order to sell a number of images to patrons, this requires commercial transactions roughly equal to the number of pictures sold. The method of the present invention allows a number of images to be printed and collected for sale in a single monetary transaction, greatly reducing the time and cost of the transactions.

The remote identification equipment used in the method of the present invention are generally inexpensive to purchase and install, and can be operated with minimal human intervention or maintenance. The financial factors, especially relative to other methods that require considerable human intervention along with high operating costs, provide the opportunity to operate such a system very profitably.

The present invention can be utilized in a variety of entertainment and other settings. In addition to its uses in amusement and theme parks, the method may also be employed in ski areas, beach resorts, cruise ships and other venues. In a ski slope setting, the image recorder and remote identity reader may be located in a fixed location where skiers are likely to pass. In beach or cruise ship venues, roving photographers can use mobile remote identification readers to determine the identity of image subjects. Additional venues for which the method may be employed include natural parks, casinos, circuses, and event centers catering to weddings and confirmations, corporate and charitable events, and the like.

The components that comprise the identification tags, readers, image recorders, image storage devices and image distribution stations will contain many electronic and digital components, which can be customized to provide many different system characteristics and effects. Furthermore, the system components may be used in different combinations and sequences, depending on the application to which they are utilized. The foregoing description is considered as illustrative only of the principles of the invention. It should be apparent to one skilled in the art that the above-mentioned embodiments are merely illustrations of a few of the many possible specific embodiments of the present invention. Numerous and varied other arrangements can be readily devised by those skilled in the art without departing from the spirit and scope of the invention, which is defined by the following claims.

What is claimed is:

1. A method of capturing and distributing images of patrons, in a venue, the method comprising the steps of:
   capturing electronic visual images of patrons at the venue;
   obtaining identifying data comprising a substantially unique personal identifier associated with each of the patrons within the electronic visual images, by using a directional sensor capable of remotely sensing, and wherein the steps of capturing and obtaining occur substantially simultaneously;
   identifying the patrons from the identifying data;
   storing the captured electronic visual images and the identifications of the patrons who are represented within each of same electronic visual images in association with each other; and
   distributing visual images derived from the electronic visual images by relating the identifications of the patrons requesting images to identifications stored in association with the stored electronic; visual images and, by retrieving at least a subset of the associated electronic visual images from storage.

2. The method of claim 1, wherein the step of obtaining utilizes tags conveyed by the patrons, and wherein each tag is associated with the substantially unique personal identifier of the patron conveying the tag.

3. The method of claim 2, wherein each tag comprises pulsed light output means wherein the personal identifier is encoded in modulated light output, and wherein the remote sensor comprises a light sensor.

4. The method of claim 2, wherein each tag comprises an optically-sensed identifier that is remotely sensed by an electronic optical detection system.

5. The method of claim 4, wherein the optically-sensed identifier comprises a bar code symbology.

6. The method of claim 4, wherein the optically-sensed identifier comprises printed text.

7. The method of claim 4, wherein the optically-sensed identifier comprises a color code.

8. The method of claim 4, wherein the optically-sensed identifier comprises a circular spatial pattern.

9. The method of claim 2, wherein the identifier is encoded in modulated sound energy emitted by a sound emitter, and wherein the sensor comprises a microphone.

10. The method of claim 9, wherein the sound emitter is associated with a trigger signal receiver, wherein an external trigger signal of which the receiver is receptive induces the emitter to emit the identifier encoded in modulated sound energy.

11. The method of claim 10, wherein the external trigger signal comprises modulated sound energy.

12. The method of claim 10, wherein the external trigger signal comprises a radio frequency signal.

13. The method of claim 1, wherein the identifier is sensed within the electronic visual images, and wherein the directional sensor comprises the image capturing means.

14. The method of claim 1, wherein the step of identifying comprises a step of machine-executed facial recognition.

15. The method of claim 14, wherein the step of machine-executed facial recognition uses the captured electronic visual images.

16. The method of claim 1, wherein the step of capturing comprises videographic recording.

17. The method of claim 1, wherein the steps of capturing, storing and distributing additionally include similarly capturing, storing and distributing audio representations of the patrons in conjunction with the corresponding visual images of the patrons.

18. The method of claim 1, wherein the step of distributing includes the step of printing the visual images of the patrons.

19. The method of claim 1, wherein the step of distributing includes providing the visual images of the patrons in digital format.

20. The method of claim 19, wherein the step of providing includes the step of transmitting the electronic visual images of the patrons in digital format over a wide area digital communications network.

21. The method of claim 1, wherein the step of distributing involves the use of a monitor on which visual images corresponding to the patron requesting visual images for distribution can be viewed by the patron.

22. The method of claim 1, wherein requests by the patron for distribution of visual images are transmitted over a wide area digital communications network.

23. The method of claim 1, wherein the step of distributing comprises a second step of identifying patrons by sensing the substantially unique personal identifier, wherein the patron identification is used to select stored electronic visual images relating to the patron for retrieval.

24. The method of claim 1, wherein the means of capturing is located in a fixed, predetermined location.

25. The method of claim 1, wherein the means of capturing moves in a predetermined path.

26. The method of claim 1, wherein the means of capturing is mobile and whose path is not predetermined, and wherein the step of capturing is initiated manually.

27. The method of claim 26, wherein the electronic visual images are transmitted from the means of capturing to the means of storage via wireless transmission.

28. The method of claim 1, additionally including the step of modifying the electronic visual images.

29. The method of claim 28, wherein the step of modifying comprises interspersing pre-recorded videographic recordings not containing the patrons with videographic recordings of the patrons.

30. The method of claim 28, herein the step of modifying comprises replacing a subset of image elements in the electronic digital images.

31. The method of claim 28, wherein the step of modifying comprises merging image elements so as to eliminate edge transition effects.

32. The method of claim 1, including the additional step of directing the patron to perform an observable action.

33. A system of capturing and distributing images of patrons in a venue, comprising:
an identifier physically-associated with each patron wherein the identifier encodes a substantially unique identification code;
an image capturing device which captures electronic visual images of the patrons;
a directional sensor remote from the patrons which is receptive of the identifier, wherein the image capturing device and the directional sensor operate substantially simultaneously;
an electronic decoder associated with the sensor which decodes the identification code received by the sensor from the identifier;
a storage device associated with the image capturing device and the decoder and receptive of the electronic visual images and identification codes, wherein the electronic visual images are stored in association with the related identification codes; and
a selector associated with the storage device which retrieves electronic visual images when provided with the related patron identification codes.

34. The system of claim 33, wherein the identifier comprises a tag conveyed by the patron.

35. The system of claim 34, wherein the tag produces modulated light output, and wherein the directional sensor comprises a light sensor.

36. The system of claim 34, wherein the directional sensor comprises an optical sensor, and the identifier is optically-sensed.

37. The system of claim 36, wherein the identifier comprises a bar code symbology.

38. The system of claim 36, wherein the identifier comprises printed text.

39. The system of claim 36, wherein the identifier comprises a color code.

40. The system of claim 34, wherein the identifier comprises a circular spatial pattern.

41. The system of claim 34, wherein the directional sensor comprises a microphone, and the tag comprises a sound emitter.

42. The system of claim 41, wherein the sound emitter is associated with a trigger signal receiver, wherein an external trigger signal of which the receiver is receptive induces the emitter to emit the identifier encoded in modulated sound energy.

43. The system of claim 42, wherein the external trigger signal comprises modulated sound energy.

44. The system of claim 42, wherein the external trigger signal comprises a radio frequency signal.

45. The system of claim 33, wherein the identifier is sensed within the electronic visual images, and wherein the directional sensor comprises the image capturing device.

46. The system of claim 33, wherein the directional sensor comprises an optical sensor and wherein the identifier comprises physical characteristics of the patron's face, wherein the electronic decoder comprises a facial recognizer.

47. The system of claim 46, wherein the optical sensor comprises the image capturing device.

48. The system of claim 33, wherein the image capturing device comprises a videograph recorder.

49. The system of claim 33, wherein the image capturing device, the storage device, and the selector additionally capture, store and select audio representations of the patrons in conjunction with the corresponding visual images of the patrons.

50. The system of claim 33, additionally including a printer associated with the selector, wherein the printer prints visual images of the patrons when the selector is provided with the related patron identification codes.

51. The system of claim 33, additionally including a digital reproducer associated with the selector, wherein electronic visual images retrieved by the selector are reproduced for the patron in digital format.

52. The system of claim 51, wherein the reproducer transmits electronic visual images over a wide area digital communications network to the patron.

53. The system of claim 33, additionally including an image display associated with the selector on which image display the visual images corresponding to the patron requesting visual images can be viewed by the patron.

54. The system of claim 33, additionally including a wide area communications network associated with the selector, wherein the patron requests for visual images to be retrieved are transmitted over the communications network.

55. The system of claim 33, additionally including a second directional sensor associated with the selector which is receptive of the identification code encoded in the identifier, wherein the second directional sensor provides identification codes to the selector.

56. The system of claim 33, wherein the image capturing device is located in a fixed, predetermined location.

57. The system of claim 33, wherein the image capturing device moves in a predetermined path.

58. The system of claim 33, wherein the image capturing device is mobile and whose path is not predetermined, and wherein the image capturing device is manually actuated.

59. The system of claim 58, wherein electronic visual images are transmitted from the image capturing device to the storage device via wireless communication.

60. The system of claim 33, additionally including an electronic visual image modifier associated with the storage device, wherein the electronic visual images are modified by the modifier.

61. The system of claim 60, wherein the electronic visual image modifier intersperses pre-recorded videographic recordings not containing the patrons with videographic recordings of the patrons.

62. The system of claim 60, wherein the electronic visual image modifier replaces a subset of image elements in the electronic digital images.

63. The system of claim 60, wherein the electronic visual image modifier merges image elements so as to eliminate edge transition effects.

64. The system of claim 33, additionally including a task director associated with the image capturing device, wherein the task director directs the patrons to perform an observable action that can be captured by the image capture device.

65. A method of capturing and distributing images of patrons, including at least a first patron, in a venue, the method comprising the steps of:

capturing an electronic visual image of the first patron, wherein the electronic visual image comprises an electronic representation of both the first patron and a substantially-unique identifier associated with the first patron;

identifying the first patron within the electronic visual image using the electronic representation of the identifier present within the electronic visual image;

storing the captured electronic visual image and the identification of the first patron in association with each other; and distributing 4 visual image derived from the electronic visual image by relating the identification of the first patron to the identification stored in association with the stored electronic visual image and by retrieving the associated electronic visual image from storage.

66. The method of claim 65, wherein the identifier comprises a tag conveyed by the first patron.

67. The method of claim 66, wherein the tag comprises a color code.

68. The method of claim 65, wherein the identifier comprises physical characteristics of the first patron's face, and wherein the step of identifying comprises facial recognition.

* * * * *